(12) United States Patent
George et al.

(10) Patent No.: US 9,485,022 B2
(45) Date of Patent: *Nov. 1, 2016

(54) RADIO-OVER-FIBER (ROF) SYSTEM FOR PROTOCOL-INDEPENDENT WIRED AND/OR WIRELESS COMMUNICATION

(71) Applicant: Corning Optical Communications LLC, Hickory, NC (US)

(72) Inventors: Jacob George, Horseheads, NY (US); Michael Sauer, Corning, NY (US); Dean Michael Thelen, Addison, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,243

(22) Filed: Dec. 11, 2015

(65) Prior Publication Data

US 2016/0099779 A1 Apr. 7, 2016

Related U.S. Application Data

(63) Continuation of application No. 14/146,949, filed on Jan. 3, 2014, now Pat. No. 9,219,879, which is a continuation of application No. 13/595,099, filed on Aug. 27, 2012, now Pat. No. 8,639,121, which is a continuation of application No. 12/618,613, filed on Nov. 13, 2009, now Pat. No. 8,280,259.

(51) Int. Cl.
*H04B 10/00* (2013.01)
*H04B 10/2575* (2013.01)
(Continued)

(52) U.S. Cl.
CPC .. *H04B 10/25751* (2013.01); *H04B 10/25754* (2013.01); *H04N 7/15* (2013.01);
(Continued)

(58) Field of Classification Search
CPC ............... H04B 10/25751; H04B 10/25754; H04B 10/112; H04B 10/116; H04B 10/118; H04B 10/1123; H04B 10/1127; H04B 10/1129; H04B 10/1143; H04B 10/1149; H04J 14/0267; H04J 14/0269
USPC ......... 398/115, 116, 117, 45, 48, 49, 50, 56, 398/57, 58, 66, 68, 72, 79, 118, 128, 130; 370/328, 338, 352, 389, 392, 503, 329, 370/351, 342; 455/561, 562, 562.1, 445, 455/422, 524, 560
See application file for complete search history.

(56) References Cited

U.S. PATENT DOCUMENTS 4,365,865 A 12/1982 Stiles
4,449,246 A 5/1984 Seiler et al.
(Continued)

FOREIGN PATENT DOCUMENTS

AU 645192 B 10/1992
AU 731180 B2 3/1998
(Continued)

OTHER PUBLICATIONS

Non-final Office Action for U.S. Appl. No. 14/518,574, mailed Jan. 6, 2016, 16 pages.
(Continued)

*Primary Examiner* — Hanh Phan
(74) *Attorney, Agent, or Firm* — C. Keith Montgomery

(57) ABSTRACT

A switched wireless system is used to increase the range of peer-to-peer communications. The optically-switched fiber optic communication system includes a head-end unit (HEU) having a switch bank. Cables couple the HEU to one or more remote access points in different coverage areas. The switch bank in the HEU provides a link between the remote access points in the different coverage areas such that devices in the different cellular coverage areas communicate with each other, such as through videoconferencing. By using the switched communication system, the range and coverage of communication between devices may be extended such that devices in different coverage areas and devices using different communication protocols can communicate.

17 Claims, 11 Drawing Sheets

(51) Int. Cl.
- *H04N 7/15* (2006.01)
- *H04Q 11/00* (2006.01)
- *H04W 16/26* (2009.01)
- *H04W 76/02* (2009.01)
- *H04W 84/12* (2009.01)
- *H04W 88/08* (2009.01)
- *H04W 92/20* (2009.01)

(52) U.S. Cl.
CPC ........ *H04Q 11/0067* (2013.01); *H04W 16/26* (2013.01); *H04W 88/085* (2013.01); *H04W 76/02* (2013.01); *H04W 84/12* (2013.01); *H04W 88/08* (2013.01); *H04W 92/20* (2013.01)

(56) References Cited

U.S. PATENT DOCUMENTS

| | | | |
|---|---|---|---|
| 4,573,212 | A | 2/1986 | Lipsky |
| 4,665,560 | A | 5/1987 | Lange |
| 4,867,527 | A | 9/1989 | Dotti et al. |
| 4,889,977 | A | 12/1989 | Haydon |
| 4,896,939 | A | 1/1990 | O'Brien |
| 4,916,460 | A | 4/1990 | Powell |
| 4,939,852 | A | 7/1990 | Brenner |
| 4,972,346 | A | 11/1990 | Kawano et al. |
| 5,039,195 | A | 8/1991 | Jenkins et al. |
| 5,042,086 | A | 8/1991 | Cole et al. |
| 5,056,109 | A | 10/1991 | Gilhousen et al. |
| 5,059,927 | A | 10/1991 | Cohen |
| 5,125,060 | A | 6/1992 | Edmundson |
| 5,187,803 | A | 2/1993 | Sohner et al. |
| 5,189,718 | A | 2/1993 | Barrett et al. |
| 5,189,719 | A | 2/1993 | Coleman et al. |
| 5,206,655 | A | 4/1993 | Caille et al. |
| 5,208,812 | A | 5/1993 | Dudek et al. |
| 5,210,812 | A | 5/1993 | Nilsson et al. |
| 5,260,957 | A | 11/1993 | Hakimi |
| 5,263,108 | A | 11/1993 | Kurokawa et al. |
| 5,267,122 | A | 11/1993 | Glover et al. |
| 5,268,971 | A | 12/1993 | Nilsson et al. |
| 5,278,690 | A | 1/1994 | Vella-Coleiro |
| 5,278,989 | A | 1/1994 | Burke et al. |
| 5,280,472 | A | 1/1994 | Gilhousen et al. |
| 5,297,225 | A | 3/1994 | Snow et al. |
| 5,299,947 | A | 4/1994 | Barnard |
| 5,301,056 | A | 4/1994 | O'Neill |
| 5,325,223 | A | 6/1994 | Bears |
| 5,339,058 | A | 8/1994 | Lique |
| 5,339,184 | A | 8/1994 | Tang |
| 5,343,320 | A | 8/1994 | Anderson |
| 5,377,035 | A | 12/1994 | Wang et al. |
| 5,379,455 | A | 1/1995 | Koschek |
| 5,381,459 | A | 1/1995 | Lappington |
| 5,396,224 | A | 3/1995 | Dukes et al. |
| 5,400,391 | A | 3/1995 | Emura et al. |
| 5,420,863 | A | 5/1995 | Taketsugu et al. |
| 5,424,864 | A | 6/1995 | Emura |
| 5,444,564 | A | 8/1995 | Newberg |
| 5,457,557 | A | 10/1995 | Zarem et al. |
| 5,459,727 | A | 10/1995 | Vannucci |
| 5,469,523 | A | 11/1995 | Blew et al. |
| 5,519,830 | A | 5/1996 | Opoczynski |
| 5,543,000 | A | 8/1996 | Lique |
| 5,546,443 | A | 8/1996 | Raith |
| 5,557,698 | A | 9/1996 | Gareis et al. |
| 5,574,815 | A | 11/1996 | Kneeland |
| 5,598,288 | A | 1/1997 | Collar |
| 5,606,725 | A | 2/1997 | Hart |
| 5,615,034 | A | 3/1997 | Hori |
| 5,627,879 | A | 5/1997 | Russell et al. |
| 5,640,678 | A | 6/1997 | Ishikawa et al. |
| 5,642,405 | A | 6/1997 | Fischer et al. |
| 5,644,622 | A | 7/1997 | Russell et al. |
| 5,648,961 | A | 7/1997 | Ebihara |
| 5,651,081 | A | 7/1997 | Blew et al. |
| 5,657,374 | A | 8/1997 | Russell et al. |
| 5,668,562 | A | 9/1997 | Cutrer et al. |
| 5,677,974 | A | 10/1997 | Elms et al. |
| 5,682,256 | A | 10/1997 | Motley et al. |
| 5,694,232 | A | 12/1997 | Parsay et al. |
| 5,703,602 | A | 12/1997 | Casebolt |
| 5,708,681 | A | 1/1998 | Malkemes et al. |
| 5,726,984 | A | 3/1998 | Kubler et al. |
| 5,765,099 | A | 6/1998 | Georges et al. |
| 5,790,536 | A | 8/1998 | Mahany et al. |
| 5,790,606 | A | 8/1998 | Dent |
| 5,793,772 | A | 8/1998 | Burke et al. |
| 5,802,173 | A | 9/1998 | Hamilton-Piercy et al. |
| 5,802,473 | A | 9/1998 | Rutledge et al. |
| 5,805,975 | A | 9/1998 | Green, Sr. et al. |
| 5,805,983 | A | 9/1998 | Naidu et al. |
| 5,809,395 | A | 9/1998 | Hamilton-Piercy et al. |
| 5,809,431 | A | 9/1998 | Bustamante et al. |
| 5,812,296 | A | 9/1998 | Tarusawa et al. |
| 5,818,619 | A | 10/1998 | Medved et al. |
| 5,818,883 | A | 10/1998 | Smith et al. |
| 5,821,510 | A | 10/1998 | Cohen et al. |
| 5,825,651 | A | 10/1998 | Gupta et al. |
| 5,838,474 | A | 11/1998 | Stilling |
| 5,839,052 | A | 11/1998 | Dean et al. |
| 5,852,651 | A | 12/1998 | Fischer et al. |
| 5,854,986 | A | 12/1998 | Dorren et al. |
| 5,859,719 | A | 1/1999 | Dentai et al. |
| 5,862,460 | A | 1/1999 | Rich |
| 5,867,485 | A | 2/1999 | Chambers et al. |
| 5,867,763 | A | 2/1999 | Dean et al. |
| 5,875,211 | A | 2/1999 | Cooper |
| 5,881,200 | A | 3/1999 | Burt |
| 5,883,882 | A | 3/1999 | Schwartz |
| 5,896,568 | A | 4/1999 | Tseng et al. |
| 5,903,834 | A | 5/1999 | Wallstedt et al. |
| 5,910,776 | A | 6/1999 | Black |
| 5,913,003 | A | 6/1999 | Arroyo et al. |
| 5,917,636 | A | 6/1999 | Wake et al. |
| 5,930,682 | A | 7/1999 | Schwartz et al. |
| 5,936,754 | A | 8/1999 | Ariyavisitakul et al. |
| 5,943,372 | A | 8/1999 | Gans et al. |
| 5,946,622 | A | 8/1999 | Bojeryd |
| 5,949,564 | A | 9/1999 | Wake |
| 5,953,670 | A | 9/1999 | Newson |
| 5,959,531 | A | 9/1999 | Gallagher, III et al. |
| 5,960,344 | A | 9/1999 | Mahany |
| 5,969,837 | A | 10/1999 | Farber et al. |
| 5,983,070 | A | 11/1999 | Georges et al. |
| 5,987,303 | A | 11/1999 | Dutta et al. |
| 6,005,884 | A | 12/1999 | Cook et al. |
| 6,006,069 | A | 12/1999 | Langston et al. |
| 6,006,105 | A | 12/1999 | Rostoker et al. |
| 6,011,980 | A | 1/2000 | Nagano et al. |
| 6,014,546 | A | 1/2000 | Georges et al. |
| 6,016,426 | A | 1/2000 | Bodell |
| 6,023,625 | A | 2/2000 | Myers, Jr. |
| 6,037,898 | A | 3/2000 | Parish et al. |
| 6,061,161 | A | 5/2000 | Yang et al. |
| 6,069,721 | A | 5/2000 | Oh et al. |
| 6,088,381 | A | 7/2000 | Myers, Jr. |
| 6,118,767 | A | 9/2000 | Shen et al. |
| 6,122,529 | A | 9/2000 | Sabat, Jr. et al. |
| 6,127,917 | A | 10/2000 | Tuttle |
| 6,128,470 | A | 10/2000 | Naidu et al. |
| 6,128,477 | A | 10/2000 | Freed |
| 6,148,041 | A | 11/2000 | Dent |
| 6,150,921 | A | 11/2000 | Werb et al. |
| 6,157,810 | A | 12/2000 | Georges et al. |
| 6,192,216 | B1 | 2/2001 | Sabat, Jr. et al. |
| 6,194,968 | B1 | 2/2001 | Winslow |
| 6,212,397 | B1 | 4/2001 | Langston et al. |
| 6,222,503 | B1 | 4/2001 | Gietema |
| 6,223,201 | B1 | 4/2001 | Reznak |
| 6,232,870 | B1 | 5/2001 | Garber et al. |
| 6,236,789 | B1 | 5/2001 | Fitz |
| 6,236,863 | B1 | 5/2001 | Waldroup et al. |
| 6,240,274 | B1 | 5/2001 | Izadpanah |

(56) References Cited

U.S. PATENT DOCUMENTS

| | | |
|---|---|---|
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,558 B2 | 7/2004 | Chiu et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,901,061 B1 | 5/2005 | Joo et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,931,813 B2 | 8/2005 | Collie |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |

(56) References Cited

U.S. PATENT DOCUMENTS

| | | |
|---|---|---|
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,254,330 B2 | 8/2007 | Pratt et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,495,560 B2 | 2/2009 | Easton et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,565,080 B2 | 7/2009 | Mickelsson et al. |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,591 B2 | 3/2010 | Soto et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,073,329 B2 | 12/2011 | Gao et al. |

(56) References Cited

U.S. PATENT DOCUMENTS

| | | |
|---|---|---|
| 8,082,353 B2 | 12/2011 | Huber et al. |
| 8,086,192 B2 | 12/2011 | Rofougaran et al. |
| 8,107,815 B2 | 1/2012 | Akasaka et al. |
| 8,135,102 B2 | 3/2012 | Wiwel et al. |
| 8,213,401 B2 | 7/2012 | Fischer et al. |
| 8,223,795 B2 | 7/2012 | Cox et al. |
| 8,228,849 B2 | 7/2012 | Trachewsky |
| 8,238,463 B1 | 8/2012 | Arslan et al. |
| 8,270,387 B2 | 9/2012 | Cannon et al. |
| 8,275,262 B2 | 9/2012 | Cui et al. |
| 8,280,250 B2 | 10/2012 | Brodsky et al. |
| 8,280,259 B2 * | 10/2012 | George ............ H04B 10/25754 370/328 |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,351,792 B2 | 1/2013 | Zheng |
| 8,374,508 B2 | 2/2013 | Soto et al. |
| 8,391,256 B2 | 3/2013 | Beach |
| 8,422,883 B2 | 4/2013 | Yeh et al. |
| 8,428,510 B2 | 4/2013 | Stratford et al. |
| 8,452,178 B2 | 5/2013 | Gao et al. |
| 8,462,683 B2 | 6/2013 | Uyehara et al. |
| 8,472,579 B2 | 6/2013 | Uyehara et al. |
| 8,488,966 B2 | 7/2013 | Zheng |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadksy et al. |
| 8,639,121 B2 * | 1/2014 | George ............ H04B 10/25754 370/328 |
| 8,649,684 B2 | 2/2014 | Casterline et al. |
| 8,676,214 B2 | 3/2014 | Fischer et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 9,107,086 B2 | 8/2015 | Leimeister et al. |
| 9,112,547 B2 | 8/2015 | Scheinert et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045518 A1 | 4/2002 | Dalebout et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0139064 A1 | 10/2002 | Norwood |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0126294 A1 | 7/2003 | Thorsteinson et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0240884 A1 | 12/2004 | Gumaste et al. |
| 2004/0258105 A1 | 12/2004 | Spathas et al. |
| 2004/0267971 A1 | 12/2004 | Seshadri |
| 2005/0013612 A1 | 1/2005 | Yap |
| 2005/0052287 A1 | 3/2005 | Whitesmith et al. |
| 2005/0058451 A1 | 3/2005 | Ross |
| 2005/0058455 A1 | 3/2005 | Aronson et al. |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |

(56) References Cited

U.S. PATENT DOCUMENTS

| | | |
|---|---|---|
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083512 A1 | 4/2006 | Wake |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0146755 A1 | 7/2006 | Pan et al. |
| 2006/0159388 A1 | 7/2006 | Kawase et al. |
| 2006/0172775 A1* | 8/2006 | Conyers ............... H04W 84/14 455/561 |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280370 A1 | 12/2007 | Liu |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159744 A1 | 7/2008 | Soto et al. |
| 2008/0166094 A1 | 7/2008 | Bookbinder et al. |
| 2008/0191682 A1 | 8/2008 | Cook |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0260389 A1 | 10/2008 | Zheng |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0097855 A1 | 4/2009 | Thelen et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0014868 A1 | 1/2010 | McGlynn et al. |
| 2010/0027443 A1 | 2/2010 | LoGalbo et al. |
| 2010/0054746 A1 | 3/2010 | Logan |
| 2010/0056200 A1 | 3/2010 | Tolonen |

(56) References Cited

U.S. PATENT DOCUMENTS

| | | |
|---|---|---|
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0099451 A1 | 4/2010 | Saban et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0150556 A1 | 6/2010 | Soto et al. |
| 2010/0156721 A1 | 6/2010 | Alamouti et al. |
| 2010/0158525 A1 | 6/2010 | Walter |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0208656 A1 | 8/2010 | Oh |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1* | 10/2010 | Adhikari ............ H04W 88/085 398/116 |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0116794 A1 | 5/2011 | George et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268449 A1 | 11/2011 | Berlin et al. |
| 2011/0274021 A1 | 11/2011 | He et al. |
| 2011/0281536 A1 | 11/2011 | Lee et al. |
| 2011/0312340 A1 | 12/2011 | Wu et al. |
| 2012/0069880 A1 | 3/2012 | Lemson et al. |
| 2012/0177026 A1 | 7/2012 | Uyehara et al. |
| 2012/0230695 A1 | 9/2012 | O'Krafka et al. |
| 2012/0257893 A1 | 10/2012 | Boyd et al. |
| 2012/0281565 A1 | 11/2012 | Sauer |
| 2012/0321305 A1 | 12/2012 | George et al. |
| 2013/0012195 A1 | 1/2013 | Sabat, Jr. et al. |
| 2013/0089332 A1 | 4/2013 | Sauer et al. |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0249292 A1 | 9/2013 | Blackwell, Jr. et al. |
| 2014/0016583 A1 | 1/2014 | Smith |
| 2014/0072064 A1 | 3/2014 | Lemson et al. |
| 2014/0118464 A1 | 5/2014 | George et al. |
| 2014/0119735 A1 | 5/2014 | Cune et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0243033 A1 | 8/2014 | Wala et al. |
| 2015/0037041 A1 | 2/2015 | Cune et al. |

FOREIGN PATENT DOCUMENTS

| | | |
|---|---|---|
| CA | 2065090 C | 2/1998 |
| CA | 2242707 A1 | 1/1999 |
| CN | 1207841 A | 2/1999 |
| CN | 1230311 A | 9/1999 |
| CN | 1980088 A | 6/2007 |
| CN | 101043276 A | 9/2007 |
| CN | 101340647 A | 1/2009 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0899976 A2 | 3/1999 |
| EP | 0993124 A2 | 4/2000 |
| EP | 0994582 A1 | 4/2000 |
| EP | 1037411 A2 | 9/2000 |
| EP | 1089586 A2 | 4/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1916806 A1 | 4/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2319439 A | 5/1998 |
| GB | 2323252 A | 9/1998 |

(56) References Cited

FOREIGN PATENT DOCUMENTS

| | | |
|---|---|---|
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004222297 A | 8/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0209363 A2 | 1/2002 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004034098 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2007133507 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2009132824 A2 | 11/2009 |
| WO | 20099132824 A2 | 11/2009 |
| WO | 2010090999 A1 | 8/2010 |
| WO | 2010132739 A1 | 11/2010 |
| WO | 2011023592 A1 | 3/2011 |
| WO | 2011059705 A1 | 5/2011 |
| WO | 2011100095 A1 | 8/2011 |
| WO | 2011139939 A1 | 11/2011 |
| WO | 2011139942 A1 | 11/2011 |
| WO | 2011152831 A1 | 12/2011 |
| WO | 2012148938 A1 | 11/2012 |
| WO | 2012148940 A1 | 11/2012 |
| WO | 2013122915 A1 | 8/2013 |

OTHER PUBLICATIONS

Non-final Office Action for U.S. Appl. No. 14/493,966, mailed Jan. 15, 2016, 12 pages.
Notice of Allowance for U.S. Appl. No. 14/936,007 mailed Feb. 22, 2016, 9 pages.
Taiwan Search Report for application No. 099138696, dated Feb. 6, 2015, 1 page.
Toycan, M. et al., "Optical network architecture for UWB range extension beyond a single complex of cells," Presented at the 33rd European Conference and Exhibition of Optical Communication, Sep. 16-20, Berlin, Germany, VDE, 2 pages, 2008.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.

(56) References Cited

OTHER PUBLICATIONS

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Author Unknown, RFID Technology Overview, Date Unknown, 11 pages, 2006.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2001, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept n Wireless Network Infrastructure," Electronics Letters, Feb. 27, 1997, vol. 33, No. 5, pp. 404-406.

Windyka, John et al., "System-Level Integrated Circuit (SLIC) Technology Development for Phased Array Antenna Applications," Contractor Report 204132, National Aeronautics and Space Administration, Jul. 1997, 94 pages.

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.

Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.

Second Office Action for Chinese patent application 20078002293.6 mailed Aug. 30, 2012, 10 pages.

International Search Report for PCT/US2010/022847 mailed Jul. 12, 2010, 3 pages.

International Search Report for PCT/US2010/022857 mailed Jun. 18, 2010, 3 pages.

Decision on Appeal for U.S. Appl. No. 11/451,237 mailed Mar. 19, 2013, 7 pages.

Decision on Rejection for Chinese patent application 200780022093.6 mailed Feb. 5, 2013, 9 pages.

International Search Report and Written Opinion for International patent application PCT/US2007/013802 mailed May 8, 2008, 12 pages.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Advisory Action for U.S. Appl. No. 12/712,758 mailed Sep. 16, 2013, 3 pages.

Final Office Action for U.S. Appl. No. 12/712,758 mailed May 24, 2013, 17 pages.

Non-final Office Action for U.S. Appl. No. 12/712,758 mailed Jan. 10, 2012, 14 pages.

Examination Report for European patent application 07835803.3 mailed Aug. 13, 2013, 6 pages.

Extended European Search Report for patent application 10014262.9 mailed Mar. 14, 2011, 6 pages.

International Search Report and Written Opinion for PCT/US2012/034853 mailed Aug. 6, 2012, 12 pages.

International Search Report and Written Opinion for PCT/US2012/034855 mailed Jul. 26, 2012, 10 pages.

Written Opinion of the International Searching Authority for European patent application 11701916.6 mailed Sep. 21, 2012, 10 pages.

International Search Report for PCT/US2011/021799 mailed Apr. 6, 2011, 4 pages.

Examination Report for European patent application 10702806.0 mailed Sep. 12, 2013, 11 pages.

(56) References Cited

OTHER PUBLICATIONS

Non-final Office Action for U.S. Appl. No. 13/194,429 mailed Mar. 1, 2013, 22 pages.
Notice of Allowance for U.S. Appl. No. 13/194,429 mailed Jul. 9, 2013, 9 pages.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examiner's Answer to the Appeal Brief for U.S. Appl. No. 12/712,758 mailed Jul. 7, 2014, 12 pages.
Notice of Allowance for U.S. Appl. No. 13/592,502 mailed May 9, 2014, 9 pages.
International Search Report for PCT/US2011/034733 mailed Aug. 1, 2011, 5 pages.
International Preliminary Report on Patentability for PCT/US2011/034733 mailed Nov. 6, 2012, 7 pages.
Translation of the First Office Action for Chinese Patent Application No. 201180008168.1, mailed Jun. 5, 2014, 9 pages.
Notification of First Office Action for Chinese Patent Application No. 201010557770.8, mailed Jul. 3, 2014, 14 pages.
Non-final Office Action for U.S. Appl. No. 12/618,613 mailed Dec. 29, 2011, 10 pages.
Non-final Office Action for U.S. Appl. No. 12/618,613 mailed Jul. 5, 2012, 9 pages.
Translation of the First Office Action for Chinese Patent Application No. 201080055264.7, mailed Jun. 5, 2014, 6 pages.
Extended European Search Report for European patent application 12777604.5 mailed Oct. 1, 2014, 7 pages.
Extended European Search Report for European patent application 12776915.6 mailed Oct. 13, 2014, 7 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 mailed Nov. 28, 2014, 22 pages.
Examination Report for European patent application 10702806.0 mailed Nov. 14, 2014, 7 pages.
Decision on Appeal for U.S. Appl. No. No. 11/406,976, mailed Nov. 3, 2014, 6 pages.
Non-final Office Action for U.S. Appl. No. 13/688,448 mailed Dec. 29, 2014, 16 pages.
Non-final Office Action for U.S. Appl. No. 14/063,245 mailed Jan. 26, 2015, 22 pages.
Toycan, M. et al., "Optical network architecture for UWB range extension beyond a single complex of cells," Presented at the 33rd European Conference and Exhibition of Optical Communication, Sep. 16-20, 2007, Berlin, Germany, VDE, 2 pages.
Notice of Second Office Action for Chinese Patent Application No. 201010557770.8, mailed Mar. 10, 2015, 13 pages.

Official Communication from the European Patent Office for 10779113.9, mailed Jun. 20, 2012, 2 pages.
International Search Report for PCT/US2007/011034, mailed Apr. 3, 2008, 2 pages.
International Preliminary Report on Patentability for PCT/US2007/011034, mailed Nov. 11, 2008, 8 pages.
International Search Report for PCT/US2013/037090, mailed Jul. 22, 2013, 4 pages.
Non-Final Office Action for U.S. Appl. No. 11/430,113, mailed Apr. 10, 2008, 6 pages.
Notice of Allowance for U.S. Appl. No. 11/430,113, mailed Dec. 8, 2008, 9 pages.
Non-Final Office Action for U.S. Appl. No. 13/595,099, mailed Jun. 20, 2013, 9 pages.
Notice of Allowance for U.S. Appl. No. 13/915,882, mailed Apr. 10, 2015, 12 pages.
Final Office Action for U.S. Appl. No. 14/063,245, mailed Apr. 16, 2015, 24 pages.
Advisory Action for U.S. Appl. No. 14/063,245, mailed Jun. 8, 2015, 3 pages.
Non-Final Office Action for U.S. Appl. No. 14/146,949, mailed Dec. 3, 2014, 14 pages.
Non-Final Office Action for U.S. Appl. No. 14/146,949, mailed Apr. 14, 2015, 16 pages.
Author Unknown, "The I2C-Bus Specification," Version 2.1, Jan. 2000, Philips Semiconductors, 46 pages.
Notice of Third Office Action for Chinese Patent Application 201010557770.8 mailed Sep. 23, 2015, 15 pages.
International Search Report for PCT/US2010/054234, mailed Feb. 28, 2011, 4 pages.
Notice of Allowance for U.S. Appl. No. 14/062,289, mailed Jul. 8, 2015, 9 pages.
Non-final Office Action for U.S. Appl. No. 14/063,630 mailed Jul. 10, 2015, 19 pages.
Non-final Office Action for U.S. Appl. No. 14/172,240 mailed Jun. 5, 2015, 14 pages.
Final Office Action for U.S. Appl. No. 14/172,240 mailed Oct. 9, 2015, 23 pages.
Non-final Office Action for U.S. Appl. No. 14/465,565 mailed Jun. 26, 2015, 15 pages.
Decision on Rejection for Chinese Patent Application No. 201010557770.8, mailed Jan. 27, 2016, 16 pages.
Translation of the First Office Action for Chinese Patent Application No. 201280024385.4, mailed Jan. 28, 2016, 6 pages.
Notice of Allowance for U.S. Appl. No. 14/465,565, mailed Dec. 11, 2015, 8 pages.
Non-final Office Action for U.S. Appl. No. 14/063,630, mailed Dec. 14, 2015, 17 pages.
Advisory Action for U.S. Appl. No. 14/172,240 mailed Dec. 30, 2015, 3 pages.
Decision on Appeal for U.S. Appl. No. 12/712,758 mailed Jun. 27, 2016, 15 pages.
Final Office Action for U.S. Appl. No. 14/063,630, mailed May 12, 2016, 18 pages.
Examiner's Answer to the Appeal Brief for U.S. Appl. No. 14/172,240 mailed Jul. 1, 2016, 34 pages.
Final Office Acttion for U.S. Appl. No. 14/518,574, mailed May 12, 2016, 24 pages.
Final Office Action for U.S. Appl. No. 14/493,966, mailed Jun. 2, 2016, 11 pages.

* cited by examiner

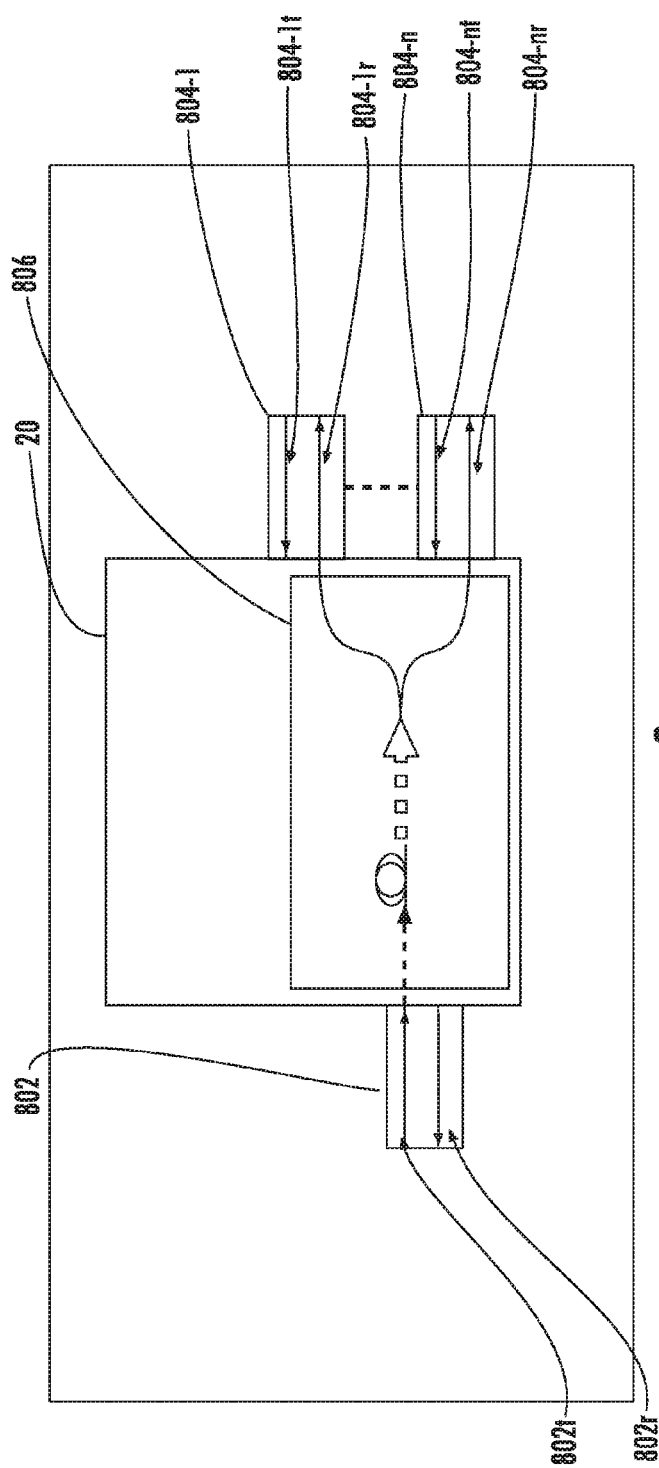
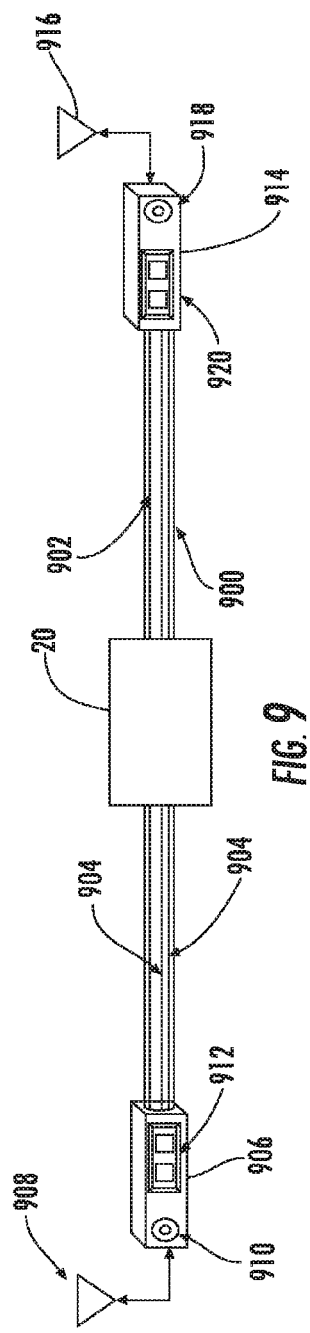
FIG. 8
FIG. 9

RADIO-OVER-FIBER (ROF) SYSTEM FOR PROTOCOL-INDEPENDENT WIRED AND/OR WIRELESS COMMUNICATION

PRIORITY

This application is a continuation of U.S. application Ser. No. 14/146,949, filed Jan. 3, 2014, which is a continuation of U.S. application Ser. No. 13/595,099, filed on Aug. 27, 2012, now U.S. Pat. No. 8,639,121, which is a continuation of U.S. application Ser. No. 12/618,613, filed on Nov. 13, 2009, now U.S. Pat. No. 8,280,259, the contents of which are relied upon and incorporated herein by reference in their entireties, and the benefit of priority under 35 U.S.C. §120 is hereby claimed.

BACKGROUND

1. Field of the Disclosure

The technology of the disclosure relates to wired and/or wireless communication systems employing a wireless communication system.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Wireless communication systems communicate with wireless devices called "clients," which must reside within the wireless range or "cell coverage area" in order to communicate with an access point device.

One approach to deploying a wireless communication system involves the use of "picocells." Picocells are radio-frequency (RF) coverage areas. Picocells can have a radius in the range from a few meters up to twenty meters as an example. Combining a number of access point devices creates an array of picocells that cover an area called a "picocellular coverage area." Because the picocell covers a small area, there are typically only a few users (clients) per picocell. This allows for simultaneous high coverage quality and high data rates for the wireless system users, while minimizing the amount of RF bandwidth shared among the wireless system users. One advantage of picocells is the ability to wirelessly communicate with remotely located communication devices within the picocellular coverage area.

One type of wireless communication system for creating picocells is called a "Radio-over-Fiber (RoF)" wireless system. A RoF wireless system utilizes RF signals sent over optical fibers. Such systems include a head-end station optically coupled to a plurality of remote units. The remote units each include transponders that are coupled to the head-end station via an optical fiber link. The transponders in the remote units are transparent to the RF signals. The remote units simply convert incoming optical signals from the optical fiber link to electrical signals via optical-to-electrical (O/E) converters, which are then passed to the transponders. The transponders convert the electrical signals to electromagnetic signals via antennas coupled to the transponders in the remote units. The antennas also receive electromagnetic signals (i.e., electromagnetic radiation) from clients in the cell coverage area and convert the electromagnetic signals to electrical signals (i.e., electrical signals in wire). The remote units then convert the electrical signals to optical signals via electrical-to-optical (E/O) converters. The optical signals are then sent to the head-end station via the optical fiber link.

Wired and wireless peer-to-peer analog and digital communications are generally limited in range and coverage, respectively. Enhancing the range of wired peer-to-peer connections may require complicated amplifying and/or repeating requirements. Extending the coverage of wireless peer-to-peer connections typically requires a denser antenna deployment and/or transmitted power increase, which may be limited by government regulations, wireless standards, and battery peak power and energy storage considerations. In addition, extending the coverage may be prohibited by the use of proprietary protocols, such as medical equipment.

SUMMARY OF THE DETAILED DESCRIPTION

Embodiments disclosed in the detailed description include optically-switched fiber optic wired and/or wireless communication systems and related methods to increase the range of wired and/or wireless peer-to-peer communication systems. The systems can be used to enable, for example, videoconferencing between peer devices. In one embodiment, the optically-switched fiber optic wired and/or wireless communication system may include a head-end unit (HEU) having an optical switch bank. A plurality of fiber optic cables, each of the plurality of fiber optic cables comprising at least one optical fiber, are configured to carry a Radio-over-Fiber (RoF) signal from the HEU to a plurality of remote access points. A first one of the plurality of remote access points is configured to form a corresponding first cellular coverage area where a first peer device is located. A second one of the plurality of remote access points is configured to form a corresponding second, different cellular coverage area where a second peer device is located. The optical switch bank is configured to dynamically establish a RoF-based optical link over at least one of the plurality of fiber optic cables such that the first peer device communicates with the second peer device at least in part over the RoF-based optical link.

Another embodiment disclosed herein provides a method of enabling communication between a first peer device in a first cellular coverage area and a second peer device in a second, different cellular coverage area. The method may include optically linking a plurality of remote access points to a HEU via a plurality of fiber optic cables, each of the plurality of fiber optic cables comprising at least one optical fiber and configured to carry a RoF signal from the HEU to the plurality of remote access points. A first one of the plurality of remote access points is configured to form the first cellular coverage area. A second one of the plurality of remote access points is configured to form the second, different cellular coverage area. A request is received to establish communications between the first peer device and the second peer device, and in response to the request, dynamic establishment of a link is performed over at least one of the plurality of fiber optic cables to allow the first peer device to communicate with the second peer device at least in part over the link.

The systems and methods disclosed herein can be configured to overcome the limitations of traditional wired and/or wireless ("wired/wireless") peer-to-peer communications by combining the low loss, high bandwidth nature of optical fiber with an appropriate optical switching network to enhance coverage (where needed). In one embodiment, the switched fiber optic wired/wireless communication system is a link system. In another embodiment, the link system is nearly protocol transparent (i.e., independent of protocol).

The switched wired/wireless communication systems and methods disclosed herein may include dense fiber cable deployment (as in picocell), which facilitates cell-to-cell peer-to-peer communication. By taking advantage of the fiber cable architecture of the switched fiber optic wired/wireless communication system, such as a Wireless Local Area Network (WLAN) picocell system, the peer-to-peer communication range is extended to be cell-to-cell. In this regard, devices in any two cells can communicate in the peer-to-peer mode independent of their physical distance, such that the peer-to-peer range extends across entire indoor installation areas.

In addition, the switched fiber optic wired/wireless communication systems and methods disclosed herein can use optical cable links that are nearly transparent to wireless protocols, thereby eliminating proprietary protocol compliance requirements. Thus, a broad variety of current applications/equipment are supported without any infrastructure upgrade, including switched video connection, switched video with Internet connection, peer-to-peer proprietary protocol equipment (e.g. medical), peer-to-peer videoconferencing, and broadcast capability (cellular and video). In addition, future applications/equipment will be possible without any infrastructure upgrade.

The switched wired/wireless communication system and method disclosed herein take advantage of a local wireless network, such as a WLAN, to initiate peer-to-peer switching, because the switching only needs a very low data rate connection. Multiple input options may be supported, such as a radio frequency (RF) cable/antenna input, an optical fiber input, and an electrical power input. Multiple output options can be used, including an RF cable/antenna output, an optical fiber output with optical/electrical conversion, an optical fiber output with the E/O conversion bypassed, and an electrical power output. The switched wired/wireless communication system disclosed herein can be upgraded to higher frequencies, such as 60 Gigahertz (GHz).

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 8 is a schematic diagram of an exemplary embodiment of using optical amplification and splitting at a HEU of an optically-switched fiber optic wired/wireless communication system for broadcasting video to peer-to-peer devices;

FIG. 9 is a schematic diagram of an exemplary embodiment of an optically-switched fiber optic wired/wireless communication system that illustrates an exemplary connection between a HEU and broadband transponders in two different locations;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include optically-switched fiber optic wired and/or wireless communication systems and related methods to increase the range of wired and/or wireless peer-to-peer communication systems. In one embodiment, the optically-switched fiber optic wired and/or wireless communication system may include a head-end unit (HEU) having an optical switch bank. A plurality of fiber optic cables, each of the plurality of fiber optic cables comprising at least one optical fiber, are configured to carry a Radio-over-Fiber (RoF) signal from the HEU to a plurality of remote access points. A first one of the plurality of remote access points is configured to form a corresponding first cellular coverage area where a first peer device is located. A second one of the plurality of remote access points is configured to form a corresponding second, different cellular coverage area where a second peer device is located. The optical switch bank is configured to dynamically establish a RoF-based optical link over at least one of the plurality of fiber optic cables such that the first peer device communicates with the second peer device at least in part over the RoF-based optical link. These systems and methods can overcome the limitations of traditional wired/wireless peer-to-peer communications by combining the low loss, high bandwidth nature of optical fiber with an appropriate optical switching network to enhance coverage (where needed). In one embodiment, the optically-switched fiber optic wired/wireless communication system is a RoF-based link system. In another embodiment, the RoF-based link system is nearly protocol transparent (i.e., independent of protocol).

Figure 1:
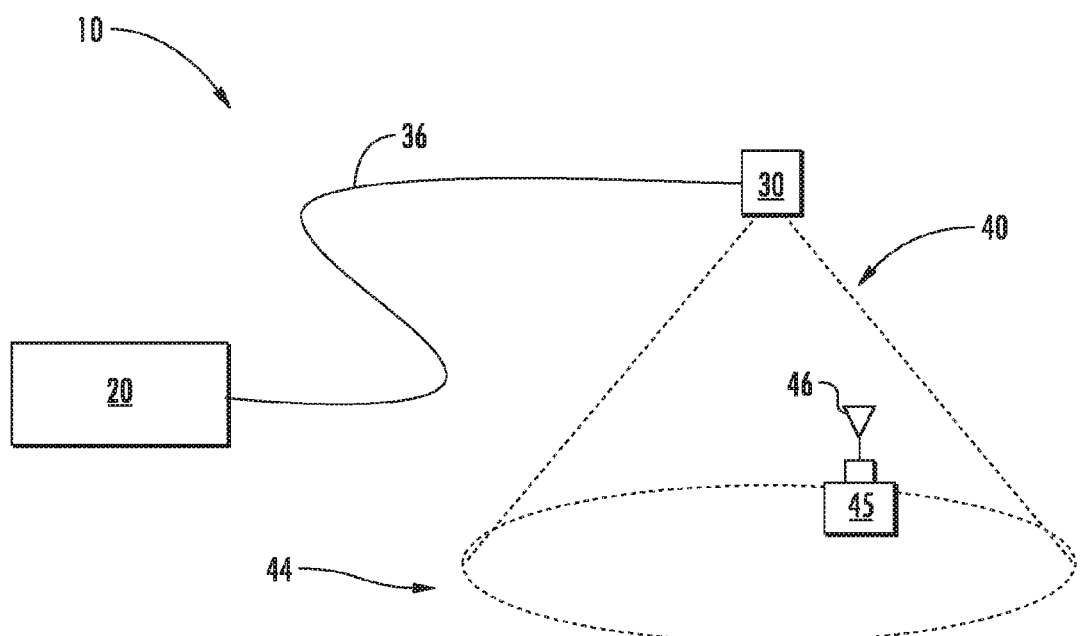
FIG. 1 is a schematic diagram of an exemplary generalized embodiment of an optical fiber-based wireless picocellular system.

Before discussing specifics regarding exemplary embodiments of optically-switched fiber optic wired/wireless communication systems disclosed herein starting with FIG. 4, FIGS. 1-3 are first set forth and discussed to describe a generalized embodiment of an optical-fiber-based wireless picocellular system. In this regard, FIG. 1 is a schematic diagram of a generalized embodiment of an optical-fiber-based wireless picocellular system 10 (also referred to herein as "system 10"). The system 10 includes a head-end unit (HEU) 20, one or more transponder or remote antenna units 30, or simply referred to herein as "remote units 30", and an optical fiber radio frequency (RF) communication link 36 that optically couples the HEU 20 to the remote unit 30. As discussed in detail below, the system 10 has a picocell 40 substantially centered about the remote unit 30. The remote units 30 form a picocellular coverage area 44. The HEU 20 is adapted to perform or to facilitate any one of a number of RF-over-fiber applications, such as radio frequency identification (RFID), wireless local area network (WLAN) communication, Bluetooth®, or cellular phone service. Shown within the picocell 40 is a device 45. The device 45 may be a hand-held communication device (e.g., a cellular telephone or personal digital assistant (PDA)), a personal computer, a video monitor, or any other device that is capable of communicating with a peer device. The device 45 may have an antenna 46 associated with it.

Figure 2:
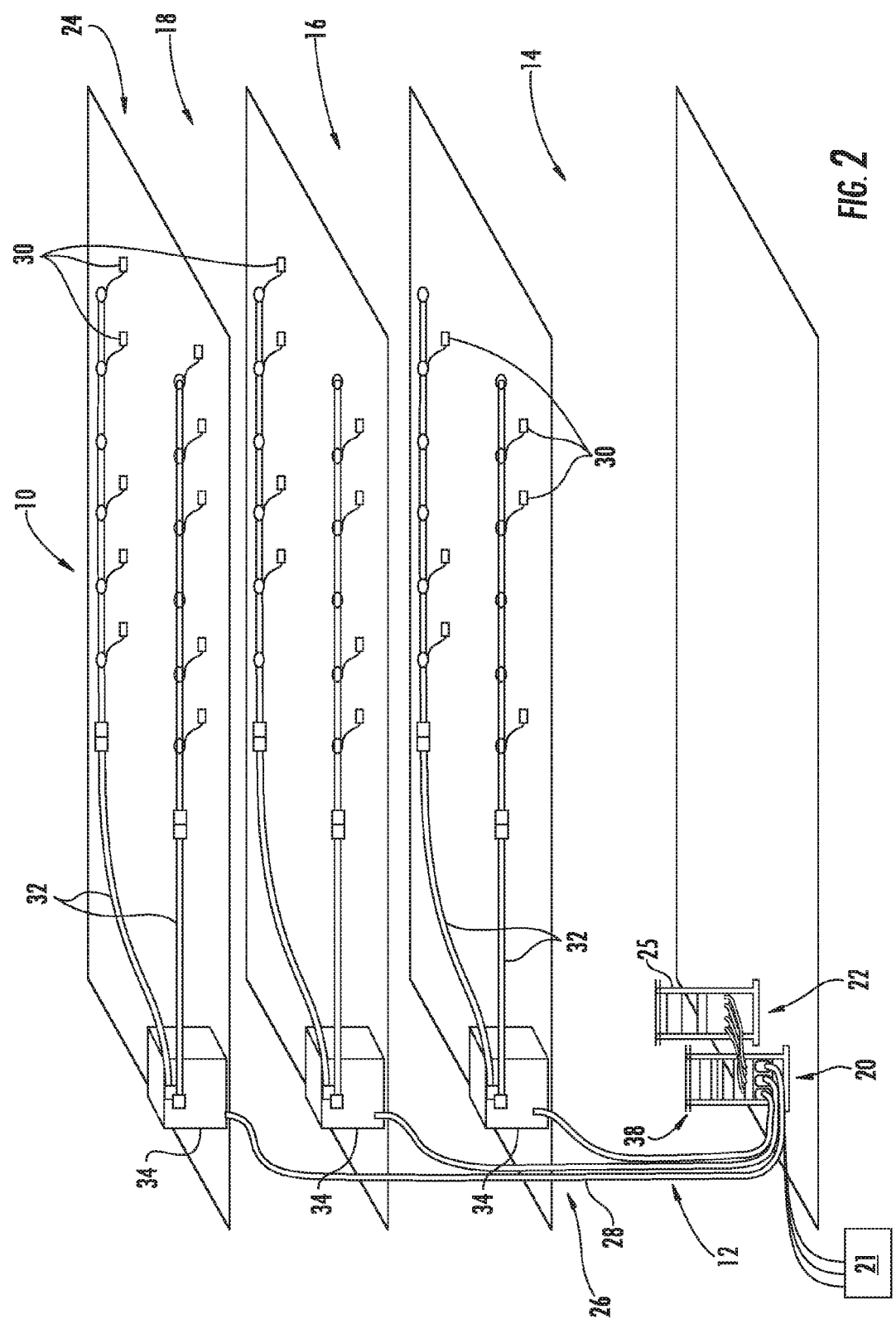
FIG. 2 is a schematic diagram of an exemplary Radio-over-Fiber (RoF) distributed communication system.

Although the embodiments described herein include any type of optically-switched fiber optic wired/wireless communication system, including any type of RoF system, an exemplary RoF distributed communication system 11 is provided in FIG. 2 to facilitate discussion of the environment in which the peer-to-peer communication between two devices in different cells is enabled. FIG. 2 includes a partially schematic cut-away diagram of a building infrastructure 12 that generally represents any type of building in which the RoF distributed communication system 11 might be employed and used. The building infrastructure 12 includes a first (ground) floor 14, a second floor 16, and a third floor 18. The floors 14, 16, 18 are serviced by the HEU 20, through a main distribution frame 22, to provide a coverage area 24 in the building infrastructure 12. Only the ceilings of the floors 14, 16, 18 are shown in FIG. 2 for simplicity of illustration.

In an example embodiment, the HEU 20 is located within the building infrastructure 12, while in another example embodiment, the HEU 20 may be located outside of the building infrastructure 12 at a remote location. A base transceiver station (BTS) 25, which may be provided by a second party such as a cellular service provider, is connected to the HEU 20, and can be co-located or located remotely from the HEU 20. In a typical cellular system, for example, a plurality of base transceiver stations are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

A main cable 26 enables multiple fiber optic cables 32 to be distributed throughout the building infrastructure 12 to remote units 30 to provide the coverage area 24 for the first, second and third floors 14, 16, and 18. Each remote unit 30 in turn services its own coverage area in the coverage area 24. The main cable 26 can include a riser cable 28 that carries all of the uplink and downlink fiber optic cables 32 to and from the HEU 20. The main cable 26 can also include one or more multi-cable (MC) connectors adapted to connect select downlink and uplink optical fiber cables to a number of fiber optic cables 32. In this embodiment, an interconnect unit (ICU) 34 is provided for each floor 14, 16, 18, the ICUs 34 including a passive fiber interconnection of optical fiber cable ports. The fiber optic cables 32 can include matching connectors. In an example embodiment, the riser cable 28 includes a total of thirty-six (36) downlink and thirty-six (36) uplink optical fibers, while each of the six (6) fiber optic cables 32 carries six (6) downlink and six (6) uplink optical fibers to service six (6) remote units 30. Each fiber optic cable 32 is in turn connected to a plurality of remote units 30 each having an antenna that provides the overall coverage area 24.

In this example embodiment, the HEUs 20 provide electrical radio-frequency (RF) service signals by passing (or conditioning and then passing) such signals from one or more outside networks 21 to the coverage area 24. The HEUs 20 are electrically coupled to an electrical-to-optical (E/O) converter 38 within the HEU 20 that receives electrical RF service signals from the one or more outside networks 21 and converts them to corresponding optical signals. The optical signals are transported over the riser cables 28 to the ICUs 34. The ICUs 34 include passive fiber interconnection of optical fiber cable ports that pass the optical signals over the fiber optic cables 32 to the remote units 30 to provide the coverage area 24. In an example embodiment, the E/O converter 38 includes a laser suitable for delivering sufficient dynamic range for the RoF applications, and optionally includes a laser driver/amplifier electrically coupled to the laser. Examples of suitable lasers for the E/O converter 38 include laser diodes, distributed feedback (DFB) lasers, Fabry-Perot (FP) lasers, and vertical cavity surface emitting lasers (VCSELs).

The HEUs 20 are adapted to perform or to facilitate any one of a number of RoF applications, including but not limited to radio-frequency identification devices (RFIDs), wireless local area network (WLAN) communications, Bluetooth®, and/or cellular phone services. In a particular example embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. In another example embodiment, the HEUs 20 provide electrical RF service signals by generating the signals directly. In yet another example embodiment, the HEUs 20 coordinate the delivery of the electrical RF service signals between client devices within the coverage area 24.

The number of optical fibers and fiber optic cables 32 can be varied to accommodate different applications, including the addition of second, third, or more HEUs 20. In this example, the RoF distributed communication system 11 incorporates multiple HEUs 20 to provide various types of wireless service to the coverage area 24. The HEUs 20 can be configured in a master/slave arrangement where one HEU 20 is the master and the other HEU 20 is a slave. Also, one or more than two HEUs 20 may be provided depending on desired configurations and the number of coverage area 24 cells desired.

Figure 3:
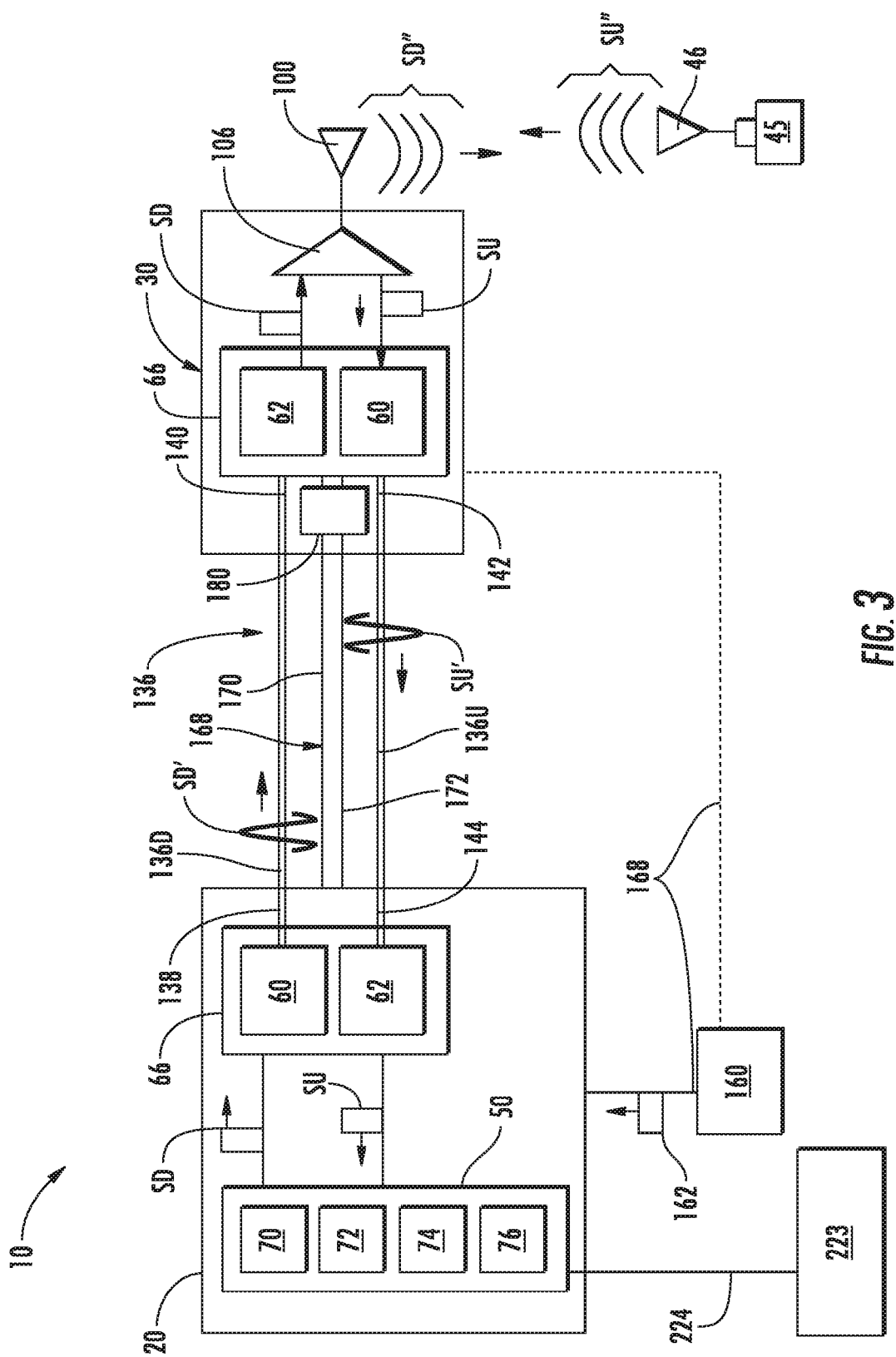
FIG. 3 is a more detailed schematic diagram of an exemplary embodiment of the system of FIG. 1, showing the head-end unit (HEU) and one remote unit and picocell of the exemplary system of FIG. 1.

FIG. 3 is a schematic diagram of an exemplary embodiment of the optical fiber-based wireless picocellular system 10 of FIG. 1. In this exemplary embodiment, the HEU 20 includes a service unit 50 that provides electrical RF service signals for a particular wireless service or application. The service unit 50 provides electrical RF service signals by passing (or conditioning and then passing) such signals from one or more outside networks 223, as described below. In a particular embodiment, this may include providing ultra wide band-impulse response (UWB-IR) signal distribution in the range of 3.1 to 10.6 GHz. Other signal distribution is also possible, including WLAN signal distribution as specified in the IEEE 802.11 standard, i.e., in the frequency range from 2.4 to 2.5 GHz and from 5.0 to 6.0 GHz. In another embodiment, the service unit 50 may provide electrical RF service signals by generating the signals directly.

The service unit 50 is electrically coupled to an E/O converter 60 that receives an electrical RF service signal from the service unit 50 and converts it to corresponding optical signal, as discussed in further detail below. In an exemplary embodiment, the E/O converter 60 includes a laser suitable for delivering sufficient dynamic range for the RF-over-fiber applications, and optionally includes a laser driver/amplifier electrically coupled to the laser. Examples of suitable lasers for the E/O converter 60 include laser diodes, distributed feedback (DFB) lasers, Fabry-Perot (FP) lasers, and vertical cavity surface emitting lasers (VCSELs).

The HEU 20 also includes an O/E converter 62 electrically coupled to the service unit 50. The O/E converter 62 receives an optical RF service signal and converts it to a corresponding electrical signal. In one embodiment, the O/E converter 62 is a photodetector, or a photodetector electrically coupled to a linear amplifier. The E/O converter 60 and the O/E converter 62 constitute a "converter pair" 66.

In an exemplary embodiment, the service unit 50 includes an RF signal modulator/demodulator unit 70 that generates an RF carrier of a given frequency and then modulates RF signals onto the carrier. The modulator/demodulator unit 70 also demodulates received RF signals. The service unit 50 also includes a digital signal processing unit ("digital signal processor") 72, a central processing unit (CPU) 74 for processing data and otherwise performing logic and computing operations, and a memory unit 76 for storing data, such as system settings, status information, RFID tag information, etc. In an exemplary embodiment, the different frequencies associated with the different signal channels are created by the modulator/demodulator unit 70 generating different RF carrier frequencies based on instructions from the CPU 74. Also, as described below, the common frequencies associated with a particular combined picocell are created by the modulator/demodulator unit 70 generating the same RF carrier frequency.

With continuing reference to FIG. 3, in one embodiment, a remote unit 30 includes a converter pair 66, wherein the E/O converter 60 and the O/E converter 62 therein are electrically coupled to an antenna system 100 via an RF signal-directing element 106, such as a circulator. The RF signal-directing element 106 serves to direct the downlink and uplink electrical RF service signals, as discussed below. In an exemplary embodiment, the antenna system 100 includes a broadband (3.1 to 10.6 GHz) antenna integrated into a fiber optic array cable.

The remote units 30 may be a typical access point device, or part of a typical access point device. In one embodiment, the remote units 30 may be typical WLAN access points. In another embodiment, the remote units 30 may be typical broadband access points, or ultra-wide broadband (UWB) access points. In yet another embodiment, the remote units 30 may be co-existent (both WLAN and broadband-UWB) access points. The remote units 30 may be any device capable of forming a picocell or other cellular coverage area substantially centered about the remote unit 30 in which devices within the picocell or other cellular coverage area can communicate with the remote unit 30. In a further embodiment, the remote units 30 differ from the typical access point device associated with wireless communication systems in that the preferred embodiment of the remote unit 30 has just a few signal-conditioning elements and no digital information processing capability. Rather, the information processing capability is located remotely in the HEU 20, and in a particular example, in the service unit 50. This allows the remote unit 30 to be very compact and virtually maintenance free. In addition, the preferred exemplary embodiment of the remote unit 30 consumes very little power, is transparent to RF signals, and does not require a local power source.

With reference again to FIG. 3, an exemplary embodiment of the optical fiber RF communication link 136 includes a downlink optical fiber 136D having a downlink optical fiber input end 138 and a downlink optical fiber output end 140, and an uplink optical fiber 136U having an uplink optical fiber input end 142 and an uplink optical fiber output end 144. The downlink and uplink optical fibers 136D and 136U optically couple the converter pair 66 at the HEU 20 to the converter pair 66 at the remote unit 30. Specifically, the downlink optical fiber input end 138 is optically coupled to the E/O converter 60 of the HEU 20, while the downlink optical fiber output end 140 is optically coupled to the O/E converter 62 at the remote unit 30. Similarly, the uplink optical fiber input end 142 is optically coupled to the E/O converter 60 of the remote unit 30, while the uplink optical fiber output end 144 is optically coupled to the O/E converter 62 at the HEU 20.

In one embodiment, the system 10 employs a known telecommunications wavelength, such as 850 nanometers (nm), 1300 nm, or 1550 nm. In another exemplary embodiment, the system 10 employs other less common but suitable wavelengths such as 980 nm.

Exemplary embodiments of the system 10 include either single-mode optical fiber or multi-mode optical fiber for the downlink and uplink optical fibers 136D and 136U. The particular type of optical fiber depends on the application of the system 10. For many in-building deployment applications, maximum transmission distances typically do not exceed 300 meters. The maximum length for the intended RF-over-fiber transmission needs to be taken into account when considering using multi-mode optical fibers for the downlink and uplink optical fibers 136D and 136U. For example, it has been shown that a 1400 MHz/km multi-mode fiber bandwidth-distance product is sufficient for 5.2 GHz transmission up to 300 m.

In one embodiment, a 50 micrometers (µm) multi-mode optical fiber is used for the downlink and uplink optical fibers 136D and 136U, and the E/O converters 60 operate at 850 nm using commercially available VCSELs specified for 10 Gigabits per second (Gb/s) data transmission. In a more specific exemplary embodiment, OM3 50 µm multi-mode optical fiber is used for the downlink and uplink optical fibers 136D and 136U.

The system 10 also includes a power supply 160 that generates an electrical power signal 162. The power supply 160 is electrically coupled to the HEU 20 for powering the power-consuming elements therein. In one embodiment, an electrical power line 168 runs through the HEU 20 and over to the remote unit 30 to power the E/O converter 60 and the O/E converter 62 in the converter pair 66, the optional RF signal-directing element 106 (unless the optional RF signal-directing element 106 is a passive device such as a circulator), and any other power-consuming elements (not shown). In an exemplary embodiment, the electrical power line 168 includes two wires 170 and 172 that carry a single voltage and that are electrically coupled to a DC power converter 180 at the remote unit 30. The DC power converter 180 is electrically coupled to the E/O converter 60 and the O/E converter 62 in the remote unit 30, and changes the voltage or levels of the electrical power signal 162 to the power level(s) required by the power-consuming components in the remote unit 30. In one embodiment, the DC power converter 180 is either a DC/DC power converter or an AC/DC power converter, depending on the type of electrical power signal 162 carried by the electrical power line 168. In an exemplary embodiment, the electrical power line 168 includes standard electrical-power-carrying electrical wire(s), e.g., 18-26 AWG (American Wire Gauge) used in standard telecommunications and other applications. In another exemplary embodiment, the electrical power line 168 (shown as a dashed line in FIG. 3) runs directly from the power supply 160 to the remote unit 30 rather than from or through the HEU 20. In another exemplary embodiment, the electrical power line 168 includes more than two wires and carries multiple voltages.

In another embodiment, the HEU 20 is operably coupled to the outside networks 223 via a network link 224.

With reference to the optical-fiber-based wireless picocellular system 10 of FIGS. 1 and 3, the service unit 50 generates an electrical downlink RF service signal SD ("electrical signal SD") corresponding to its particular application. In one embodiment, this is accomplished by the digital signal processor 72 providing the modulator/demodulator unit 70 with an electrical signal (not shown) that is modulated onto an RF carrier to generate a desired electrical signal SD. The electrical signal SD is received by the E/O converter 60, which converts this electrical signal SD into a corresponding optical downlink RF signal SD' ("optical signal SD'"), which is then coupled into the downlink optical fiber 136D at the input end 138. It is noted here that in one embodiment, the optical signal SD' is tailored to have a given modulation index. Further, in an exemplary embodiment, the modulation power of the E/O converter 60 is controlled (e.g., by one or more gain-control amplifiers, not shown) to vary the transmission power from the antenna system 100. In an exemplary embodiment, the amount of power provided to the antenna system 100 is varied to define the size of the associated picocell 40, which in exemplary embodiments range anywhere from about a meter across to about twenty meters across.

The optical signal SD' travels over the downlink optical fiber 136D to the output end 140, where it is received by the O/E converter 62 in the remote unit 30. The O/E converter 62 converts the optical signal SD' back into an electrical signal SD, which then travels to the RF signal-directing element 106. The RF signal-directing element 106 then directs the electrical signal SD to the antenna system 100. The electrical signal SD is fed to the antenna system 100, causing it to radiate a corresponding electromagnetic downlink RF signal SD" ("electromagnetic signal SD").

When the device 45 is located within the picocell 40, the electromagnetic signal SD" is received by the antenna 46. The antenna 46 converts the electromagnetic signal SD" into an electrical signal SD in the device 45, and processes the electrical signal SD. The device 45 can generate electrical uplink RF signals SU, which are converted into electromagnetic uplink RF signals SU" ("electromagnetic signal SU'") by the antenna 46.

When the device 45 is located within the picocell 40, the electromagnetic signal SU" is detected by the antenna system 100 in the remote unit 30, which converts the electromagnetic signal SU" back into an electrical signal SU. The electrical signal SU is directed by the RF signal-directing element 106 to the E/O converter 60 in the remote unit 30, which converts this electrical signal into a corresponding optical uplink RF signal SU' ("optical signal SU'"), which is then coupled into the input end 142 of the uplink optical fiber 136U. The optical signal SU' travels over the uplink optical fiber 136U to the output end 144, where it is received by the O/E converter 62 at the HEU 20. The O/E converter 62 converts the optical signal SU' back into an electrical signal SU, which is then directed to the service unit 50. The service unit 50 receives and processes the electrical signal SU, which in one embodiment includes one or more of the following: storing the signal information; digitally processing or conditioning the signals; sending the signals on to one or more outside networks 223 via network links 224; and sending the signals to one or more devices 45 in the picocellular coverage area 44. In an exemplary embodiment, the processing of the electrical signal SU includes demodulating the electrical signal SU in the modulator/demodulator unit 70, and then processing the demodulated signal in the digital signal processor 72.

Figure 4:
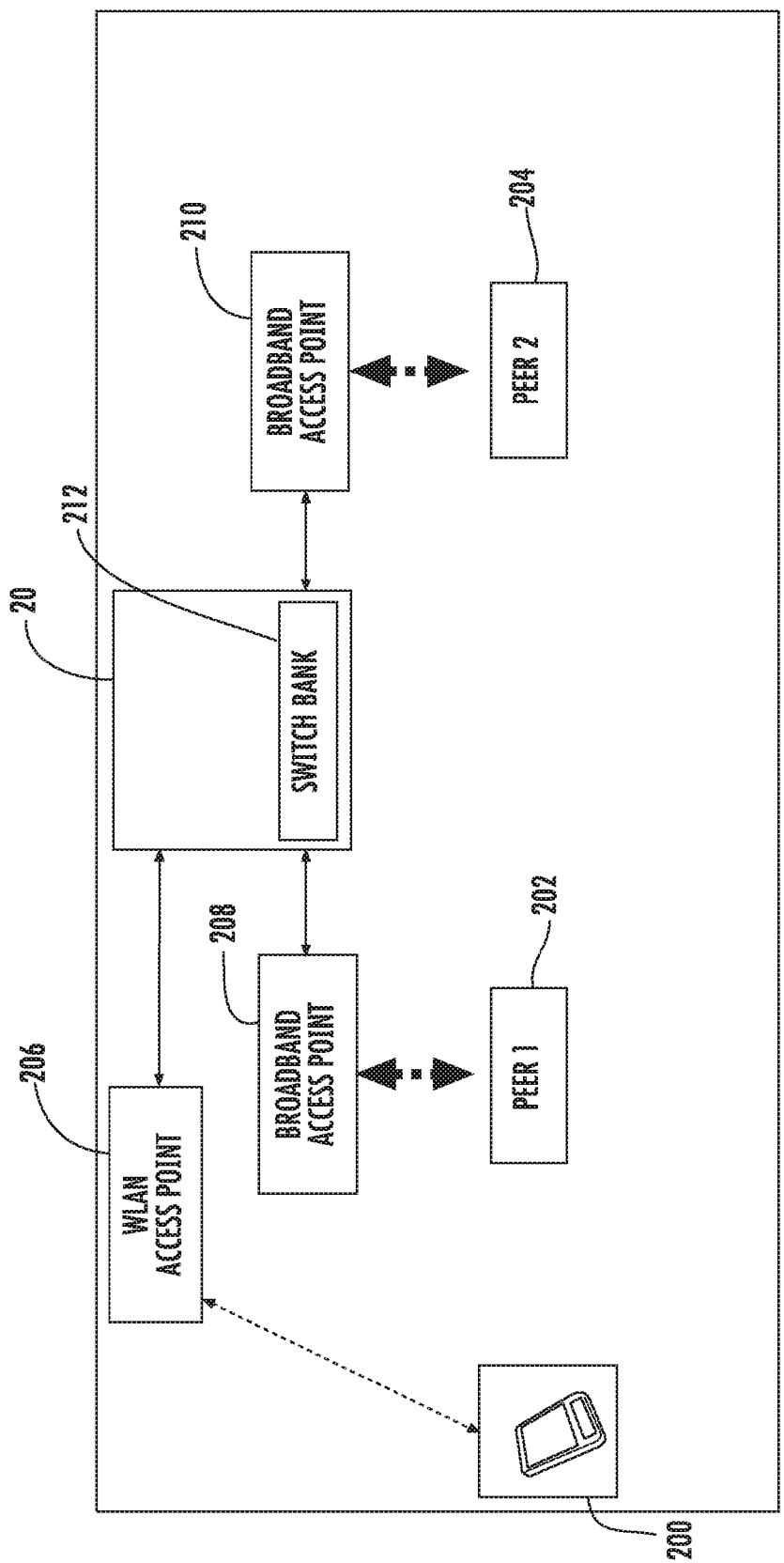
FIG. 4 is a schematic diagram of using an exemplary embodiment of an optically-switched fiber optic wired and/or wireless ("wired/wireless") communication system to allow proprietary protocol data transfer between peer-to-peer devices according to an exemplary embodiment.
Figure 5:
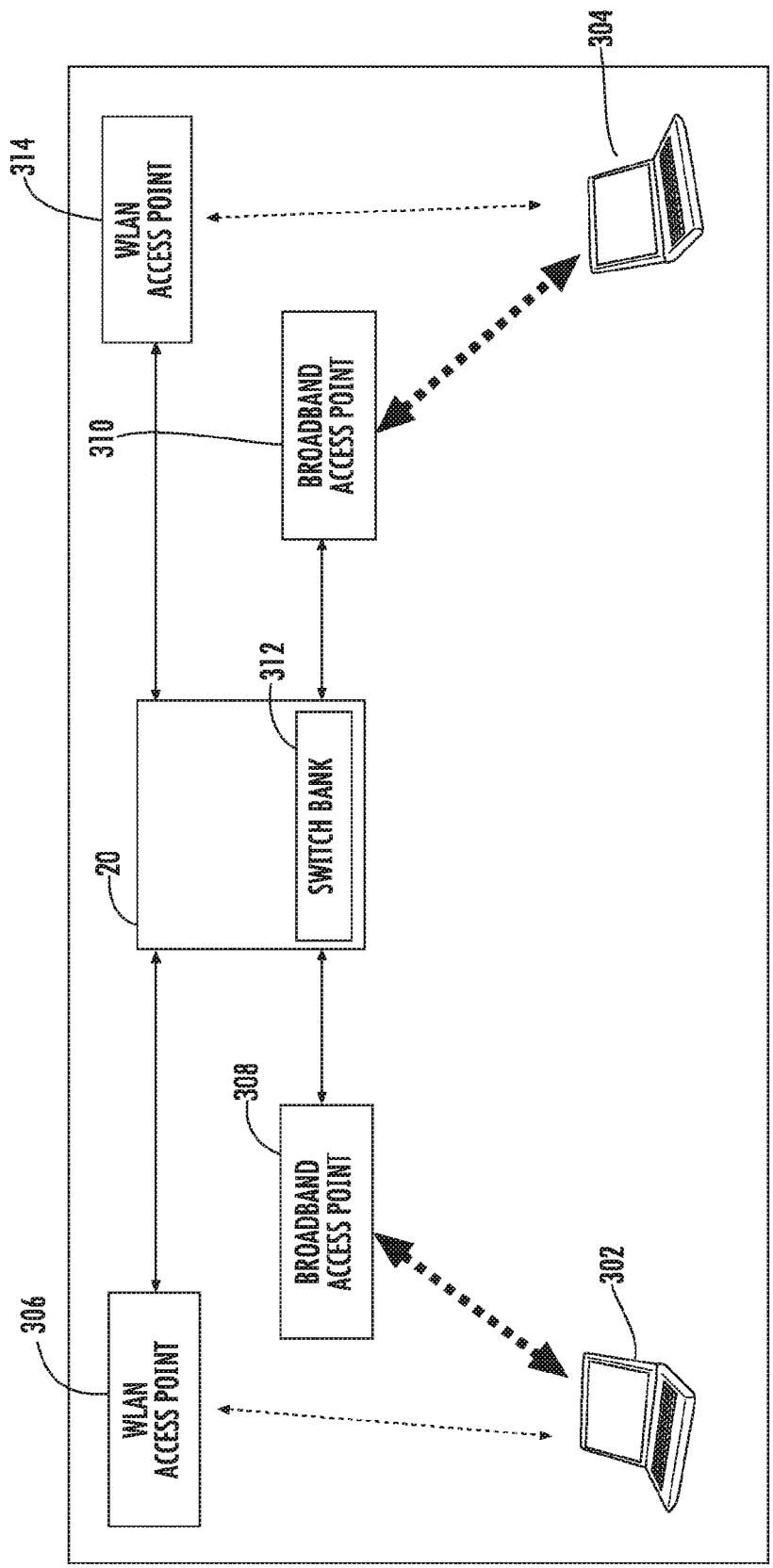
FIG. 5 is a schematic diagram of using an exemplary embodiment of an optically-switched fiber optic wired/wireless communication system to allow videoconferencing between peer-to-peer devices according to an exemplary embodiment.
Figure 6:
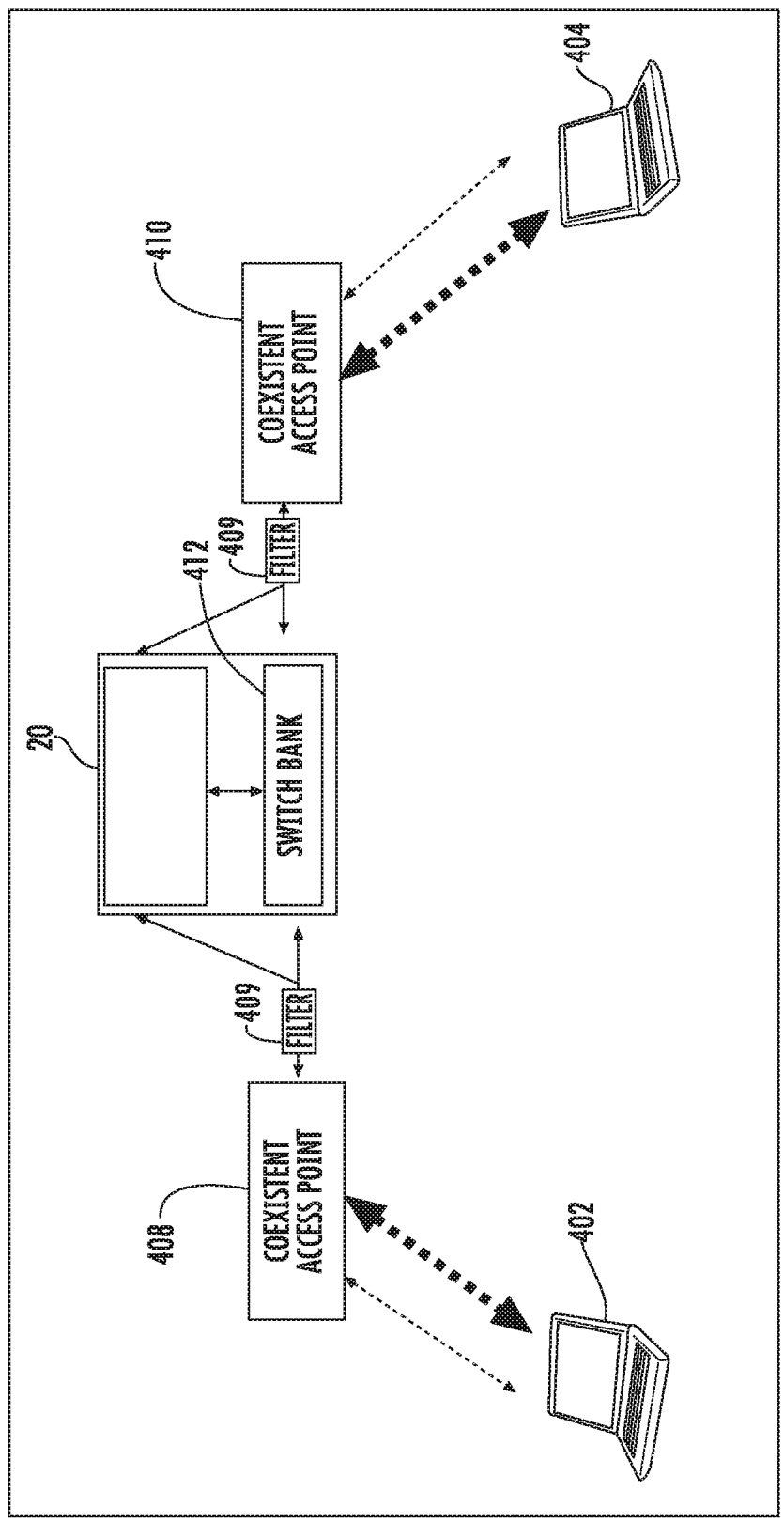
FIG. 6 is a schematic diagram of using an exemplary embodiment of an optically-switched fiber optic wired/wireless communication system to allow communication between peer-to-peer devices through co-existent access points according to an exemplary embodiment.

FIGS. 4-6 illustrate three embodiments of protocol-independent RoF wireless presence. All of these embodiments have a WLAN-requesting switching network to initiate a protocol-independent peer-to-peer connection.

FIG. 4 is a schematic diagram of using an exemplary embodiment of an optically-switched fiber optic wired/wireless communication system to allow proprietary protocol data transfer between peer-to-peer devices according to an exemplary embodiment. In FIG. 4, a peer device 202 is located in a different cellular coverage area ("cell") than a peer device 204. The peer device 202 is capable of communicating with an access point 208 through a wireless connection (indicated by the dashed line) when the peer device 202 is within a first cell defined by the access point 208. The peer device 204 is capable of communicating with an access point 210 through a wireless connection (indicated by the dashed line) when the peer device 204 is within a second cell defined by the access point 210. The access points 208 and 210 may be broadband access points, or broadband transponders. In one embodiment, the access points 208 and 210 may be similar to the remote units 30 described above with respect to FIG. 3, where the remote units 30 include a converter pair 66, wherein the E/O converter 60 and the O/E converter 62 therein are electrically coupled to an antenna system 100 via an RF signal-directing element 106, such as a circulator.

The access points 208 and 210 are optically coupled to a HEU 20 by optical fibers in a fiber optic cable (as represented by the solid lines between the access points 208 and 210 and the HEU 20). In one embodiment, the optical fibers may connect the access points 208 and 210 to the HEU 20 in a manner similar to that illustrated in FIGS. 2 and/or 3. FIG. 4 illustrates using a device 200 (e.g., PDA or cellular telephone) that is different than the peer device 202 to request the peer-to-peer switching. The device 200 sends a peer-to-peer request to a WLAN access point 206 (as indicated by the dashed line). The WLAN access point 206 is also optically coupled to the HEU 20 by optical fibers in a fiber optic cable (as represented by the solid lines between the WLAN access point 206 and the HEU 20) such that the peer-to-peer request is sent from the WLAN access point 206 to the HEU 20.

When the HEU 20 receives the peer-to-peer request, an optical switch bank 212 dynamically selects the appropriate optical fibers to connect the access points 208 and 210 so that the peer devices 202 and 204 associated with the access points 208 and 210 can communicate with each other. Once the optical switch bank 212 dynamically selects the appropriate optical fibers to connect the access points 208 and 210, the peer device 202 can communicate wirelessly with the access point 208 using whatever protocol the peer device 202 and the access point 208 are capable of using, and the peer device 204 can communicate wirelessly with the access point 210 using whatever protocol the peer device 204 and the access point 210 are capable of using. In this manner, peer-to-peer communication between the peer devices 202 and 204 in different cells using different wireless protocols is enabled through the optical switch bank 212 establishing a dynamic optical link between the access points 208 and 210 of the two different cells.

This scenario could be used in medical applications such as a hospital or other medical facility, where a doctor using a PDA might request that high resolution images (X-ray, MRI, etc.) stored on remote proprietary devices be displayed on a bedside proprietary-protocol-based monitor. For example, the peer device 202 could have be a computer in a hospital records area that has X-ray data stored on it. Through the use of the system shown in FIG. 4, the data from the peer device 202 could be transmitted to the peer device 204, which might be a computer terminal or other monitor or display in a patient's room that is on a different floor from the records room where the peer device 202 is located.

FIG. 5 is a schematic diagram of using an exemplary embodiment of an optically-switched fiber optic wired/wireless communication system to allow videoconferencing between peer-to-peer devices according to an exemplary embodiment. In FIG. 5, a peer device 302 is located in a different cell than a peer device 304. The peer device 302 is capable of communicating with an access point 308 through a wireless connection (indicated by the dashed line) when the peer device 302 is within a first cell defined by the access point 308. The peer device 304 is capable of communicating with an access point 310 through a wireless connection (indicated by the dashed line) when the peer device 304 is within a second cell defined by the access point 310. The access points 308 and 310 may be broadband access points, or broadband transponders. In one embodiment, the access points 308 and 310 may be similar to the remote units 30 described above with respect to FIG. 3, where the remote units 30 include a converter pair 66, wherein the E/O converter 60 and the O/E converter 62 therein are electrically coupled to an antenna system 100 via an RF signal-directing element 106, such as a circulator.

The access points 308 and 310 are optically coupled to a HEU 20 by optical fibers in a fiber optic cable (as represented by the solid lines between the access points 308 and 310 and the HEU 20). In one embodiment, the optical fibers may connect the access points 308 and 310 to the HEU 20 in a manner similar to that illustrated in FIGS. 2 and/or 3. The exemplary system shown in FIG. 5 works in a similar manner as that shown in FIG. 4. The scenario illustrated in FIG. 5 differs from that of FIG. 4 in that one of the peer devices 302 or 304 initiates the connection, instead of requiring a different device (e.g., PDA). This is applicable in situations where the peer devices 302 and 304 both have WLAN access and a broadband wireless (possibly proprietary-protocol) network and desire to participate in a videoconference. Thus, in one embodiment, the peer devices 302 and 304 may be computing devices, such as laptop computers, the access points 308 and 310 may be broadband access points, and the access points 306 and 314 may be WLAN access points. For example, the embodiment of FIG. 5 could utilize an existing low data rate WLAN that is insufficient for a video application (e.g., 802.11b) by allowing a laptop computer to place the request for a peer-to-peer connection on the low data rate network, and have the video information transferred via a peer-to-peer broadband higher data rate network based on wireless/UWB USB. Thus, in FIG. 5, one of the peer devices 302 or 304 initiates a request for peer-to-peer communication. The peer device 302 sends a communication request to the WLAN access point 306 or the peer device 304 sends a communication request to the WLAN access point 314 (as indicated by the thin dashed lines). The WLAN access points 306 and 314 are optically coupled to the HEU 20 by optical fibers in a fiber optic cable (as represented by the solid lines between WLAN access point 306 and the HEU 20 and between the WLAN access point 314 and the HEU 20) such that the peer-to-peer request is sent from either the WLAN access point 306 or the WLAN access point 314 to the HEU 20.

When the HEU 20 receives the peer-to-peer request, an optical switch bank 312 dynamically selects the appropriate optical fibers to connect the access points 308 and 310 so that the peer devices 302 and 304 associated with the access points 308 and 310 can communicate with each other. Once the optical switch bank 312 dynamically selects the appropriate optical fibers to connect the access points 308 and 310, the peer device 302 can communicate wirelessly with the access point 308 using whatever protocol the peer device 302 and the access point 308 are capable of using, and the peer device 304 can communicate wirelessly with the access point 310 using whatever protocol the peer device 304 and the access point 310 are capable of using. In this manner, peer-to-peer communication between the peer devices 302 and 304 in different cells using different wireless protocols is enabled through the switch bank 312 establishing a dynamic optical link between the access points 308 and 310 of the two different cells.

FIG. 6 is a schematic diagram of using an exemplary embodiment of an optically-switched fiber optic wired/wireless communication system to allow communication between peer-to-peer devices through co-existent access points according to an exemplary embodiment. In FIG. 6, a peer device 402 is located in a different cell than a peer device 404. The peer device 402 is capable of communicating with an access point 408 through a wireless connection (indicated by the thin dashed line on the left) when the peer device 402 is within a first cell defined by the access point 408. The peer device 404 is capable of communicating with an access point 410 through a wireless connection (indicated by the thin dashed line on the right) when the peer device 404 is within a second cell defined by the access point 410. The access points 408 and 410 may be coexistent access points. In one-embodiment, the access points 408 and 410 may have both WLAN and broadband (e.g. broadband-UWB) capabilities. The access points 408 and 410 are optically coupled to a HEU 20 by optical fibers in a fiber optic cable (as represented by the solid lines between the access points 408 and 410 and the HEU 20). In the embodiment where access point 408 is a coexistent access point, a filter 409 may be used to separate broadband signals, such as 2.4 Megahertz signals, from WLAN signals, such as 802.11 signals, that may be received over the fiber optic cable from the coexistent access point 408. In the embodiment where access point 410 is a coexistent access point, a filter 411 may be used to separate broadband signals, such as 2.4 Megahertz signals, from WLAN signals, such as 802.11 signals, that may be received over the fiber optic cable from the coexistent access point 410. In one embodiment, the HEU 20 automatically determines that communication between the peer devices 402 and 404 are possible based on the frequency of the signals received from the peer devices 402 and 404. In one embodiment, the HEU 20 may sense the radio frequency band content of the signals received from the peer devices 402 and 404, with one peer device being located in each cell. The HEU 20 may then automatically determine a switch configuration by using the optical switch bank 412 to connect the cells that have common radio frequency bands via a RoF-based optical link. This automatic connection eliminates the need for a peer-to-peer request from one of the peer devices 402 or 404, or from a third device. In one embodiment, the optical fibers may connect the access points 408 and 410 to the HEU 20 in a manner similar to that illustrated in FIGS. 2 and/or 3. The exemplary system shown in FIG. 6 works in a similar manner as that shown in FIGS. 4 and 5. The scenario illustrated in FIG. 6 differs from that of FIG. 5 in that only one network with coexistent capabilities is used in place of two separate networks, and that the broadband signals may be filtered from the WLAN signals. For example, the videoconferencing application example mentioned with respect to FIG. 5 would also be suitable in FIG. 6.

When the HEU 20 receives the peer-to-peer request from either peer device 402 or 404 through the access point 408 or 410, a switch bank 412 dynamically selects the appropriate optical fibers to connect the access points 408 and 410 so that the peer devices 402 and 404 associated with the access points 408 and 410 can communicate with each other. Once the switch bank 412 dynamically selects the appropriate optical fibers to connect the access points 408 and 410, the peer device 402 can communicate wirelessly with the access point 408 independent of protocol. In this manner, peer-to-peer communication between the peer devices 402 and 404 in different cells using different wireless protocols is enabled through the switch bank 412 establishing a dynamic optical link between the access points 408 and 410 of the two different cells.

Figure 7:
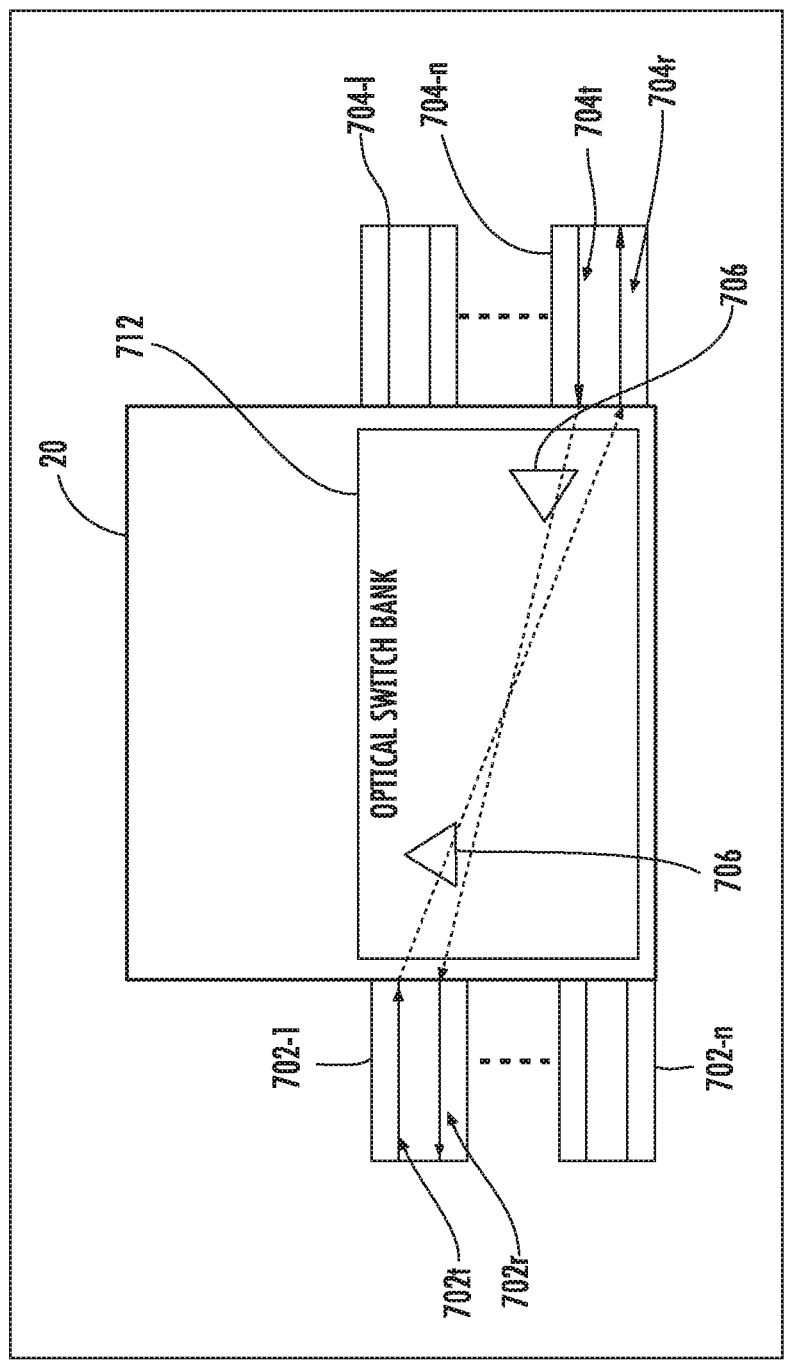
FIG. 7 is a schematic diagram of an exemplary embodiment of an optical switching bank at a HEU of an optically-switched fiber optic wired/wireless communication system.

FIG. 7 is a schematic diagram of an exemplary embodiment of an optical switching bank at a HEU of an optically-switched fiber optic wired/wireless communication system. In FIG. 7, fiber optic cables 702-1 through 702-n and 704-1 through 704-n optically couple the HEU 20 to the access point(s) of N peer devices. For example, the fiber optic cable 702-1 optically couples the HEU 20 to the access point of Peer 1 and fiber optic cable 704-n optically couples the HEU 20 to the access point of Peer N. In one embodiment, each fiber optic cable 702-1 through 702-n and 704-1 through 704-n has a transmit optical fiber and a receive optical fiber. For example, the fiber optic cable 702-1 has an optical transmit fiber 702t and an optical receive fiber 702r, and the fiber optic cable 704-n has an optical transmit fiber 704t and an optical receive fiber 704r. Thus, FIG. 7 illustrates how when a request for Peer 1 to communicate with Peer N is received at the HEU 20, an optical switch bank 712 will dynamically link the two cells where Peer 1 and Peer N are located by coupling the optical transmit fiber 702t and the optical receive fiber 702r associated with Peer 1 to the optical receive fiber 704r and the optical transmit fiber 704t associated with Peer N. In one embodiment, the HEU 20 may include optical amplifiers 706. In one embodiment, the optical amplifiers 706 may be added when it is desired to be able to enable communication between peer devices that are more than 300 meters apart.

FIG. 8 is a schematic diagram of an exemplary embodiment of using optical amplification and splitting at a HEU of an optically-switched fiber optic wired/wireless communication system for broadcasting video to peer-to-peer devices. In FIG. 8, an incoming fiber optic cable 802 couples a device that provides a video source (not shown) to the HEU 20. The fiber optic cable 802 may include an optical transmit fiber 802t and an optical receive fiber 802r in one embodiment. The HEU 20 of FIG. 8 includes a video broadcasting unit 806 that splits the video coming in over the optical transmit fiber 802t to multiple outgoing fiber optic cables 804-1 to 804-n, each of which may be optically coupled to a peer device. Each fiber optic cable 804-1 through 804-n has a transmit and a receive optical fiber. For example, the fiber optic cable 804-1 has an optical transmit fiber 804-1t and an optical receive fiber 804-1r, and the fiber optic cable 804-n has an optical transmit fiber 804-nt and an optical receive fiber 804nr. Thus, FIG. 8 illustrates how a HEU 20 that is optically coupled to a video source may broadcast video (e.g., high-definition (HD) TV (HDTV), videoconferencing, etc.) over optical fibers to multiple peer devices in different locations. In one embodiment, the video broadcasting unit 806 may also provide amplification of the video signal. Note that in certain embodiments of the video broadcasting embodiment of FIG. 8, not all of the optical transmit and receive fibers need be used. For example, the optical transmit fiber 802t of the fiber optic cable 802, as well as the optical transmit fibers 804-lt through 804-nt, are not necessarily used when a video signal is broadcast using the embodiment of FIG. 8.

FIG. 9 is a schematic diagram of an exemplary embodiment of an optically-switched fiber optic wired/wireless communication system that illustrates an exemplary connection between a HEU and broadband transponders in two different locations. In FIG. 9, the HEU 20 is optically coupled to broadband transponders 906 and 914, which may be in different cellular coverage areas. Each of the broadband transponders 906 and 914 is optically coupled to the HEU 20 via a fiber optic cable 900, which has an electrical power line 902 and one or more optical fibers 904. The broadband transponder 906 has an RF input/output 908, which in one embodiment is an RF antenna, a DC input/output 910, and an optical input/output 912. The broadband transponder 914 has an RF input/output 916, which in one embodiment is an RF antenna, a DC input/output 918, and an optical input/output 920.

Figure 10:
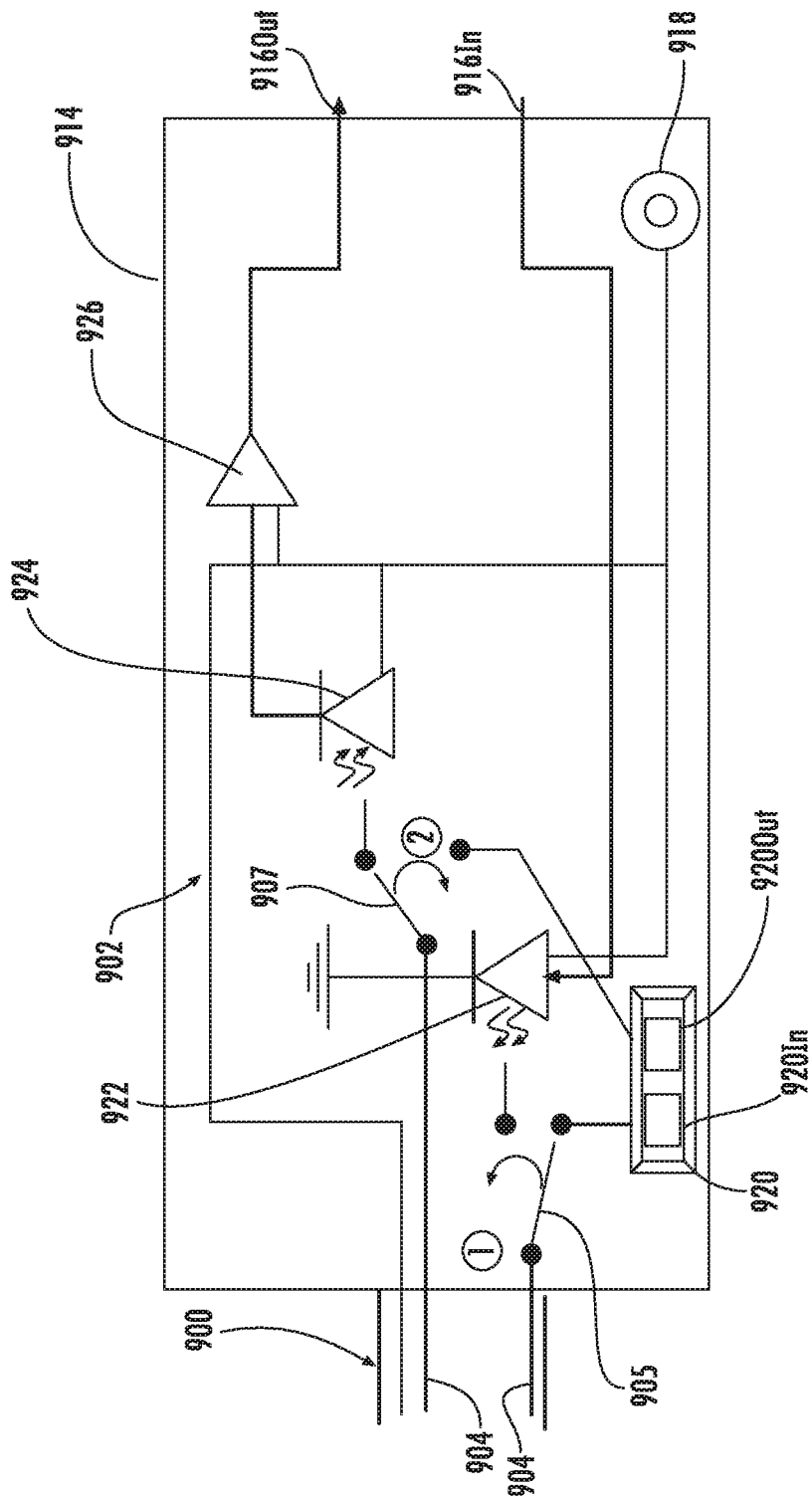
FIG. 10 is a schematic diagram of an exemplary embodiment of a broadband transponder that may be used in an exemplary embodiment of an optically-switched fiber optic wired/wireless communication system.

FIG. 10 is a schematic diagram of an exemplary embodiment of a broadband transponder that may be used in an exemplary embodiment of an optically-switched fiber optic wired/wireless communication system. FIG. 10 shows one embodiment of the broadband transponder 914 from FIG. 9 with more internal details. The broadband transponder 906 in FIG. 9 may be similar to the broadband transponder 914. The fiber optic cable 900 having the electrical power line 902 and optical fibers 904 optically couples the broadband transponder 914 to the HEU 20 (as shown in FIG. 9). The broadband transponder 914 may have an RF input/output 916In and 916Out, which in one embodiment is an RF antenna, a DC input/output 918, and an optical input/output 920In and 920Out. In one embodiment, the broadband transponder 914 may also include a laser diode 922, a photo detector 924, and a transimpedance amplifier 926. In one embodiment, optical switches 905 and 907 enable selections between the RF input/output 916In and 916Out and the optical input/output 920In and 920Out.

Figure 11:
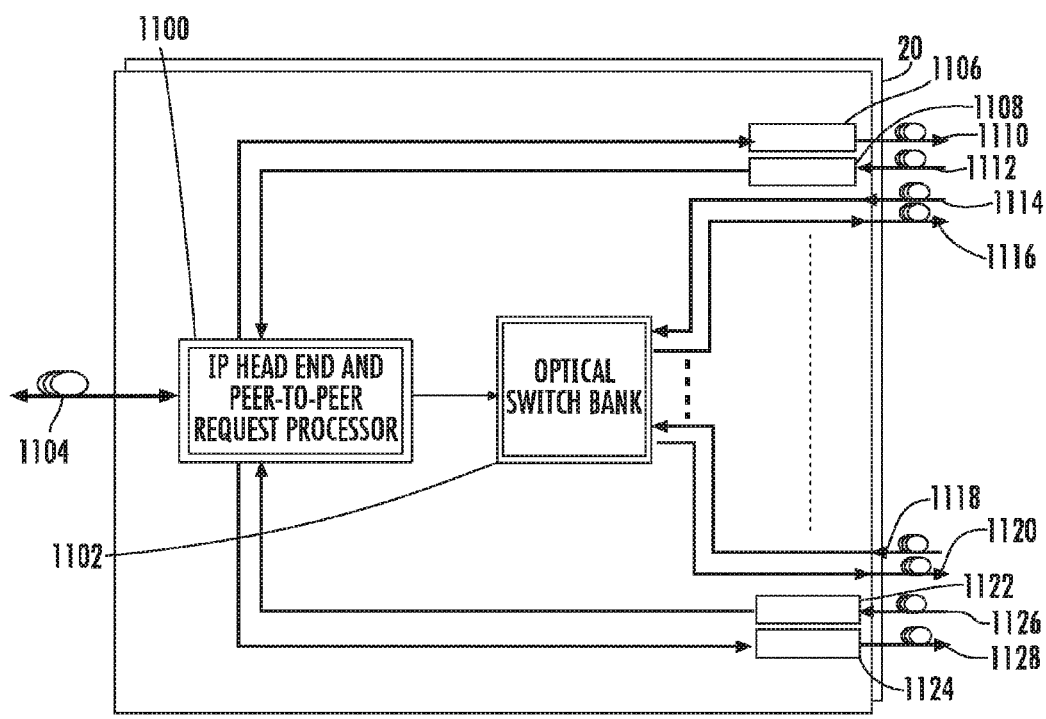
FIG. 11 is a schematic diagram of an exemplary embodiment of a HEU of an optically-switched fiber optic wired/wireless communication system.

FIG. 11 is a schematic diagram of an exemplary embodiment of a HEU of an optically-switched fiber optic wired/wireless communication system. FIG. 11 illustrates the details of an exemplary HEU that can enable communication between peer devices in N cellular coverage areas. The HEU 20 shown in FIG. 11 could be used in the exemplary embodiment of an optically-switched fiber optic wired/wireless communication system shown in FIG. 5. The HEU 20 of FIG. 11 includes a peer-to-peer request processor 1100 and optical switch bank 1102. The peer-to-peer request processor 1100 handles the requests for communication that are received from the peer devices. Together, the peer-to-peer request processor 1100 and the optical switch bank 1102 are able to provide the high bandwidth peer-to-peer connection between peer devices in different cellular coverage areas independent of protocol. The HEU 20 can receive or transmit signals to external networks over optical fiber 1104. A transmit optical fiber 1110 and a receive optical fiber 1112 optically couple the HEU 20 to a WLAN access point or transponder for a first peer device in a first cellular coverage area. An E/O converter unit 1106 and an O/E converter unit 1108 provide any necessary E/O or O/E conversion. A receive optical fiber 1114 and a transmit optical fiber 1116 optically couple the HEU 20 to the broadband access point or transponder for the first peer device. A receive optical fiber 1118 and a transmit optical fiber 1120 optically couple the HEU 20 to a broadband access point or transponder for a second peer device in a second cellular coverage area. A receive optical fiber 1126 and a transmit optical fiber 1128 optically couple the HEU 20 to a WLAN access point or transponder for the second peer device. An O/E converter unit 1122 and an E/O converter unit 1124 provide any necessary E/O or O/E conversion. It is to be understood that there may be additional sets of optical fibers if there are more than two peer devices.

Figure 12:
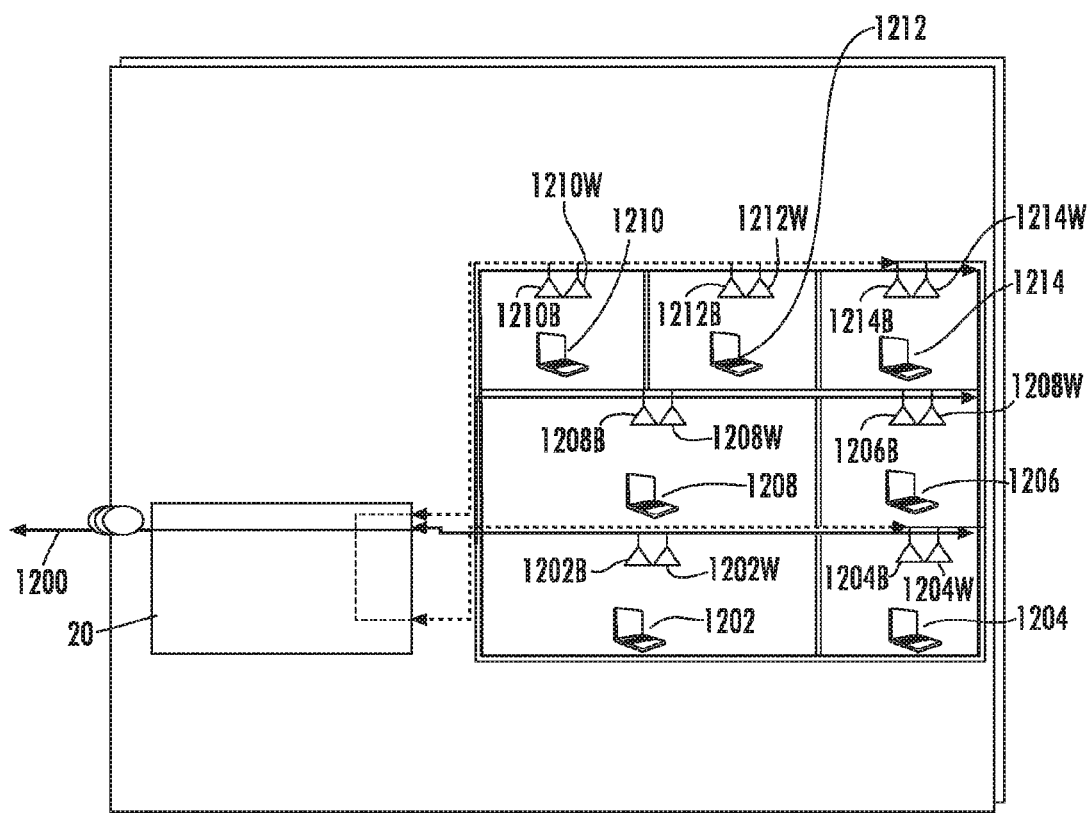
FIG. 12 is a schematic diagram of an exemplary embodiment of a Radio-over-Fiber based wireless communication system.

FIG. 12 is a schematic diagram of an exemplary embodiment of a RoF-based wireless presence communication system. FIG. 12 shows one embodiment of how the RoF-based wireless presence communication system might be implemented. Each of a plurality of peer devices 1202, 1204, 1206, 1208, 1210, 1212, and 1214 is in a different cellular coverage area. They may be in different rooms in a building, or even on different floors in a building. In one embodiment, each of a plurality of peer devices 1202, 1204, 1206, 1208, 1210, 1212, and 1214 is located such that it may be capable of communicating wirelessly via both a broadband transponder and a wireless transponder, such as a WLAN, WiMax, or cellular transponder. For example, the peer device 1202 is located such that it may be located in a cellular coverage area defined by a broadband transponder 1202B and a wireless transponder 1202W such that peer device 1202 may be capable of communicating wirelessly via both the broadband transponder 1202B and the wireless transponder 1202W. Each of the other peer devices 1204, 1206, 1208, 1210, 1212, and 1214 is also associated with a broadband transponder and a WLAN transponder such that each of the other 1204, 1206, 1208, 1210, 1212, and 1214 may be capable of communicating wirelessly via both a broadband transponder and a wireless transponder. The solid lines indicate a typical RoF wireless deployment and the dotted lines indicate the peer-to-peer fiber connection through the nearly protocol-transparent RoF technology by using the optically-switched fiber optic wired/wireless communication system disclosed herein. The typical RoF wireless deployment connects the various rooms or cells to external networks over optical fiber 1200, whereas the optically-switched fiber optic wired/wireless communication system disclosed herein, as shown by the dotted lines, allows room-to-room, or cell-to-cell, communication between devices in different cellular coverage areas, or between devices in the same cellular coverage area that use different communication protocols.

Thus, by using an optically-switched RoF wired/wireless communication system, the communication range of peer-to-peer communication systems may be increased. By using an optical switch bank in a HEU to set up a dynamic link between the transponders in two different cells, the devices in the two different cells can communicate with each other over the optical fibers through the HEU. This system overcomes the limitations of traditional wired/wireless peer-to-peer communications by combining the low loss, high bandwidth nature of optical fiber with an appropriate optical switching network to enhance coverage (where needed). By taking advantage of the fiber cable architecture of the optically-switched fiber optic wired/wireless communication system, such as a RoF WLAN picocell system, the peer-to-peer communication range is extended to be cell-to-cell. This means that devices in any two cells can communicate in the peer-to-peer mode independent of their physical distance, such that the peer-to-peer range extends across entire indoor installation areas. In addition, the optically-switched fiber optic wired/wireless communication system disclosed herein uses optical cable links that are nearly transparent to wireless protocols, thereby eliminating proprietary protocol compliance requirements.

Further, as used herein, it is intended that the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover any modifications and variations of the embodiments provided they come within the scope of the appended claims and their equivalents. Although specific terms are employed herein, they are used in a generic and descriptive sense only and not for purposes of limitation.

What is claimed is:

1. A wireless communication system, comprising:
an optical switch bank;
a plurality of remote access points distributed throughout multiple floors of a building infrastructure; and
at least one fiber optic cable, the at least one fiber optic cable comprising a plurality of optical fibers and being configured to carry Radio-over-Fiber (RoF) signals from the optical switch bank for communication with the remote access points, wherein a first one of the plurality of remote access points is configured to form a corresponding first coverage area, a second one of the plurality of remote access points is configured to form a corresponding second, different coverage area, the optical switch bank is configured to establish a RoF-based optical link over at least one of the fiber optic cables such that a first peer device in the first coverage area can communicate with a second peer device in the second coverage area at least in part over the RoF-based optical link, and at least one of the first and second ones of the plurality of remote access points is configured to communicate via both Wireless Local Area Network (WLAN) and broadband signals.

2. The wireless communication system of claim 1, wherein the at least one optical fiber cable includes thirty-six optical fibers, and wherein the first one of the plurality of remote access points is configured to wirelessly communicate with the first peer device using a different wireless communication protocol than a protocol used by the second one of the plurality of remote access points to wirelessly communicate with the second peer device.

3. The wireless communication system of claim 1, wherein the first one of the plurality of remote access points is configured to wirelessly communicate with the first peer device; and the second one of the plurality of remote access points is configured to wirelessly communicate with the second peer device.

4. The wireless communication system of claim 3, wherein the system is configured to automatically establish the RoF-based optical link between the first coverage area and the second coverage area when signals received from the first peer device in the first coverage area and signals received from the second peer device in the second coverage area have common radio frequencies.

5. The wireless communication system of claim 4, further comprising at least one WLAN access point configured to receive a request from a device other than the first and second peer devices to establish communications between the first and second peer devices.

6. The wireless communication system of claim 3, further comprising at least one WLAN access point configured to receive a request from a device other than the first and second peer devices to establish communications between the first and second peer devices.

7. The wireless communication system of claim 6, wherein the at least one optical fiber cable includes thirty-six optical fibers and comprises at least one riser cable.

8. The wireless communication system of claim 3, wherein the first one of the plurality of remote access points is configured to wirelessly communicate with the first peer device using a different wireless communication protocol than a protocol used by the second one of the plurality of remote access points to wirelessly communicate with the second peer device.

9. The wireless communication system of claim 3, wherein at least one of the plurality of remote access units further comprises at least one of a radio frequency (RF) input/output, a DC input/output, and an optical input/output.

10. The wireless communication system of claim 9, wherein the at least one optical fiber cable includes thirty-six optical fibers and comprises at least one riser cable.

11. The wireless communication system of claim 1, wherein the at least one optical fiber cable includes thirty-six uplink optical fibers and comprises at least one riser cable, and wherein the optical switch bank dynamically selects an appropriate optical fiber so that the first peer device can communicate with a second peer device.

12. The wireless communication system of claim 11, wherein the optical switch bank is located at a head-end unit (HEU), the HEU being configured to receive a request from the first peer device to communicate with a second peer device via at least one WLAN access point.

13. The wireless communication system of claim 12, wherein the HEU further comprises a video broadcast unit configured to split a video signal received at the HEU.

14. The wireless communication system of claim 1, wherein the at least one optical fiber cable includes thirty-six optical fibers, and wherein the system is configured to automatically establish the RoF-based optical link between the first coverage area and the second coverage area when signals received from the first peer device in the first coverage area and signals received from the second peer device in the second coverage area have common radio frequencies.

15. A wireless communication system, comprising:

an optical switch bank;

a plurality of remote access points distributed throughout multiple floors of a building infrastructure; and at least one fiber optic cable, the at least one fiber optic cable comprising a plurality of optical fibers and being configured to carry Radio-over-Fiber (RoF) signals from the optical switch bank for communication with the remote access points, wherein a first one of the plurality of remote access points is configured to form a corresponding first coverage area, a second one of the plurality of remote access points is configured to form a corresponding second, different coverage area, the optical switch bank is configured to establish a RoF-based optical link over at least one of the fiber optic cables such that a first peer device in the first coverage area can communicate with a second peer device in the second coverage area at least in part over the RoF-based optical link, at least one of the first and second ones of the plurality of remote access points is configured to communicate via at least one of Wireless Local Area Network (WLAN) and broadband signals, the at least one optical fiber cable includes thirty-six optical fibers, and the system is configured to automatically establish the RoF-based optical link between the first coverage area and the second coverage area when signals received from the first peer device in the first coverage area and signals received from the second peer device in the second coverage area have common radio frequencies.

16. The wireless communication system of claim 15, the at least one fiber optic cable includes at least one riser cable.

17. The wireless communication system of claim 16, the at least one fiber optic cable includes uplink cables and downlink cables.

* * * * *